United States Patent
Brakob et al.

(10) Patent No.: US 11,798,380 B2
(45) Date of Patent: Oct. 24, 2023

(54) IDENTIFYING BARCODE-TO-PRODUCT MISMATCHES USING POINT OF SALE DEVICES

(71) Applicant: Target Brands, Inc., Minneapolis, MN (US)

(72) Inventors: Christopher Brakob, Minneapolis, MN (US); Ethan Sommer, Minneapolis, MN (US); Arun Patil, Minneapolis, MN (US); Dharmavaram Arbaaz, Minneapolis, MN (US); Arun Vaishnav, Minneapolis, MN (US); Prakash Mall, Minneapolis, MN (US); Neha Dixit, Minneapolis, MN (US)

(73) Assignee: Target Brands, Inc., Minneapolis, MN (US)

( * ) Notice: Subject to any disclaimer, the term of this patent is extended or adjusted under 35 U.S.C. 154(b) by 0 days.

(21) Appl. No.: 17/856,083

(22) Filed: Jul. 1, 2022

(65) Prior Publication Data

US 2023/0005342 A1    Jan. 5, 2023

Related U.S. Application Data

(60) Provisional application No. 63/217,969, filed on Jul. 2, 2021.

(51) Int. Cl.
*G07G 1/00* (2006.01)
*G06F 18/2413* (2023.01)
(Continued)

(52) U.S. Cl.
CPC ..... *G07G 1/0045* (2013.01); *G06F 18/24137* (2023.01); *G06F 18/24147* (2023.01);
(Continued)

(58) Field of Classification Search
CPC ........ G06F 18/24137; G06F 18/24147; G07G 1/0072; G07G 1/0054; G07G 1/0045; G07G 1/0036
See application file for complete search history.

(56) References Cited

U.S. PATENT DOCUMENTS 5,494,136 A * 2/1996 Humble .................. A47F 9/047
                                                    235/383
5,883,968 A    3/1999 Welch et al.
(Continued)

*Primary Examiner* — Daniel I Walsh
(74) *Attorney, Agent, or Firm* — Barnes & Thornburg LLP

(57) ABSTRACT

Disclosed herein are systems and methods for determining whether an unknown product matches a scanned barcode during a checkout process. An edge computing device or other computer system can receive, from an overhead camera at a checkout lane, image data of an unknown product that is placed on a flatbed scanning area, identify candidate product identifications for the unknown product based on applying a classification model and/or product identification models to the image data, and determine based on the candidate product identifications, whether the unknown product matches a product associated with a barcode that is scanned at a POS terminal in the checkout lane. The classification model can be used to determine n-dimensional space feature values for the unknown product and determine which product the unknown product likely matches. The product identification models can be used to determine whether the unknown product is one of the products that are modeled.

20 Claims, 16 Drawing Sheets

US 11,798,380 B2
Page 2

(51) Int. Cl.
*G07G 3/00* (2006.01)
*G06V 10/764* (2022.01)
*G06V 20/52* (2022.01)

(52) U.S. Cl.
CPC ............ *G06V 10/764* (2022.01); *G06V 20/52* (2022.01); *G07G 3/003* (2013.01)

(56) References Cited

U.S. PATENT DOCUMENTS

| | | | |
|---|---|---|---|
| 6,347,313 B1* | 2/2002 | Ma | G06F 18/2414 707/999.005 |
| 7,422,147 B2 | 9/2008 | Rosenbaum | |
| 7,909,248 B1* | 3/2011 | Goncalves | G07G 1/0063 235/462.14 |
| 8,068,674 B2* | 11/2011 | Goncalves | G06T 7/001 382/113 |
| 8,117,071 B1 | 2/2012 | Fitch | |
| 8,336,761 B1 | 12/2012 | McCloskey | |
| 8,448,859 B2* | 5/2013 | Goncalves | G07G 1/0054 235/383 |
| 9,576,214 B1* | 2/2017 | Zhang | G06V 20/46 |
| 11,481,751 B1* | 10/2022 | Chaubard | G06V 10/82 |
| 11,488,126 B2* | 11/2022 | Altuev | G06Q 20/20 |
| 2004/0041021 A1* | 3/2004 | Nugent, Jr. | G07G 1/0045 235/383 |
| 2008/0149725 A1* | 6/2008 | Rosenbaum | G06Q 20/20 235/462.41 |
| 2009/0026269 A1* | 1/2009 | Connell, II | G06K 7/14 235/462.41 |
| 2009/0026270 A1 | 1/2009 | Connell et al. | |
| 2009/0212102 A1* | 8/2009 | Connell, II | G06F 18/22 235/375 |
| 2010/0076855 A1* | 3/2010 | Karnin | G07G 1/0063 186/61 |
| 2012/0193416 A1* | 8/2012 | Smith | G06K 7/10722 235/440 |
| 2014/0353115 A1* | 12/2014 | Baitz | G07G 1/0045 198/340 |
| 2015/0055855 A1* | 2/2015 | Rodriguez | G06V 10/774 382/155 |
| 2016/0350738 A1* | 12/2016 | Crooks | G06V 20/95 |
| 2017/0161703 A1* | 6/2017 | Dodia | G07G 1/0072 |
| 2018/0157881 A1* | 6/2018 | Beghtol | G06K 7/10792 |
| 2018/0218350 A1* | 8/2018 | Crooks | G06K 1/121 |
| 2019/0311346 A1* | 10/2019 | Costello | G06Q 20/4016 |
| 2020/0042491 A1* | 2/2020 | Licht | G06V 10/764 |
| 2020/0104851 A1* | 4/2020 | Agarwal | G06N 3/084 |
| 2020/0151692 A1* | 5/2020 | Gao | G06Q 20/201 |
| 2021/0049400 A1* | 2/2021 | Scott | G06K 7/1443 |
| 2021/0117948 A1* | 4/2021 | Voss | G06Q 20/322 |
| 2022/0114868 A1* | 4/2022 | Bronicki | G06Q 20/40145 |
| 2022/0147966 A1* | 5/2022 | Babcock | G06K 19/06037 |
| 2022/0309553 A1* | 9/2022 | Gibbon | G06Q 30/0643 |
| 2022/0414924 A1* | 12/2022 | Krishnamurthy | G06N 20/00 |
| 2023/0004888 A1* | 1/2023 | Li | G06N 5/048 |
| 2023/0005342 A1* | 1/2023 | Brakob | G06V 20/52 |
| 2023/0037427 A1* | 2/2023 | Brakob | G06Q 20/208 |
| 2023/0056327 A1* | 2/2023 | Brakob | G06V 40/28 |
| 2023/0071821 A1* | 3/2023 | Noh | G06V 20/64 |
| 2023/0098811 A1* | 3/2023 | Shevtsov | G06Q 20/206 705/16 |
| 2023/0124756 A1* | 4/2023 | Trim | G07G 1/0063 705/23 |

* cited by examiner

IDENTIFYING BARCODE-TO-PRODUCT MISMATCHES USING POINT OF SALE DEVICES

INCORPORATION BY REFERENCE

This application claims priority to U.S. Provisional Application Ser. No. 63/217,969, filed on Jul. 2, 2021, the disclosure of which is incorporated by reference in its entirety.

TECHNICAL FIELD

This document generally describes devices, systems, and methods related to determining whether a product label that has been scanned matches a scanned product.

BACKGROUND

In retail environments, such as grocery stores, customers can purchase different types of products that can be priced differently. Prices can vary based on category or grouping of products. For example, fresh produce can be priced differently than frozen foods. As another example, grocery items can be priced differently than electronics or clothing.

When a customer checks out in a retail environment, such as at a self-checkout lane with a point of sale terminal, a product label, such as a barcode, can be scanned to identify a product that the customer is purchasing. The product identifier can be used to determine the product price, which can be retrieved from a database storing current prices associated with product identifiers, as well as any discounts or promotions that may apply as part of the transaction. Sometimes, the product label can be a sticker, barcode, or other type of label that can be removed from the product. In some instances, customers may attempt to remove a label from a product and replace it with a label of another, different product so that the scan registers as a different product than the product passed over the scanner. This can be known as ticket swapping. Ticket swapping may constitute a form of theft in that a customer may pay for a first product with a lower price even though the customer physically checks out with a second product with a higher price (when the label for the first product is placed over the label on the second product).

SUMMARY

The document generally relates to determining whether a product label that has been scanned is incorrect for a scanned product. In particular, using sensors (e.g., cameras, RFID readers) that are located in or around the point of sale terminal to capture additional information (e.g., images) about scanned products and machine learning models, the disclosed technology can automatically and accurately determine whether a product identified based on the additional information (e.g., image data) matches a scanned product label, such as a barcode. For example, ticket switching can be difficult to detect in the moment because, conventionally, the only input at the point of sale terminal is the barcode scan identifying the barcode that has been read. The disclosed technology can, however, add additional signals captured by sensors located in or around the point of sale terminal, such as images of the physical product that is being scanned (apart from the label/barcode), which can be used to determine whether the actual product matches the barcode that is being scanned. For example, an initial training phase can be used to generate models for products and their associated barcodes using features identified from images of those products as they were scanned. When a barcode is scanned, a model for the product associated with the barcode can be retrieved, features of the physical product can be identified from images of the physical product as it was scanned, and a determination of whether the physical product matches the product associated with the barcode based on the model and the features of the physical product. Such a determination may simply determine whether, or a degree to which, the physical product matches the product associated with the scanned barcode (i.e., whether ticket switching has taken place), and/or it may positively identify the physical product based on the detected features and used that positive identification to determine whether there is a match (i.e., product code for positively identified product matches the product code for the scanned barcode). Other determinations are also possible.

An edge computing device can determine whether an imaged product is likely the same as a product that a point of sale (POS) terminal identifies from a scanned barcode. The edge computing device can also positively identify the imaged product in some implementations when the device determines that the imaged product does not match the scanned barcode. Thus, the disclosed technology can be used to resolve situations in which a customer places a barcode from one product onto another product, which can be referred to herein as ticket swapping.

A camera can be attached to a light pole of a checkout lane. This configuration can be the same across different stores. As a result, each camera can capture images of a flatbed scanning area through a consistent field of view (FOV). The consistent FOV can make it easier and more accurate for a computing system to train machine learning models to identify products using image data. The checkout lane can also include a POS terminal, scanning devices, an edge computing device, and one or more additional cameras. A customer can scan a product label, such as a barcode, using the scanning devices. The POS terminal can identify a product associated with the scanned barcode and can transmit that identification to the edge computing device.

An edge computing device can also receive image data from the camera attached to the light pole and/or one or more of the additional cameras at the checkout lane. Using machine learning models, the edge computing device can identify the product in the image data. For example, the edge computing device can use an n-dimensional space classification model to determine likelihood of what the imaged product may be. As another example, the edge computing device can use one or more item identification models to determine likelihood of what the imaged product may be. Using output from the applied model(s), the edge computing device can determine whether the imaged product matches the scanned barcode. if the edge computing device identifies a mismatch between the imaged product and the scanned barcode, the edge computing device can identify what the product most likely is. Identification results of the edge computing device can also be outputted. For example, the identification results can be transmitted to asset protection (AP) such that AP can respond to a potential identified ticket swapping incident.

Moreover, the one or more additional cameras at the checkout lane can be used to monitor the customer as they proceed through the checkout process. Image data captured by such cameras can be used to identify the customer once the edge computing device determines that an imaged product does not match a scanned barcode. AP can therefore use this image data to positively and objectively identify and stop the customer who is caught ticket swapping.

One or more embodiments described herein include a checkout lane apparatus configured to determine whether an unknown product matches a scanned barcode during a checkout process, the checkout lane apparatus including: a flatbed scanning area that can receive one or more products to be purchased by a user, the flatbed scanning area including one or more scanning devices and cameras, a vertical post positioned proximate the flatbed scanning area, the vertical post including a camera positioned above the flatbed scanning area and having a field of view that includes the flatbed scanning area, the camera being configured to capture image data of an unknown product as it is moved over the flatbed scanning area, and a point of sale (POS) terminal that can scan, using one or more of the scanning devices and cameras, a product identifier of the unknown product, identify, based on the scanned product identifier, a product associated with the scanned product identifier, and transmit, to an edge computing device, information about the product associated with the scanned product identifier. The checkout lane apparatus can also include an edge computing device that can determine whether the unknown product matches the product associated with the scanned product identifier, the edge computing device being able to: receive, from the camera of the vertical post, the image data of the unknown product, retrieve, from a data store, one or more product identification models, the product identification models having been trained and generated by a computing system, identify physical feature values for the unknown product based on applying the one or more product identification models to the image data, determine, based on the physical feature values for the unknown product, whether the unknown product matches the product associated with the scanned product identifier, and return an indication of a ticket swapping event based on a determination that the unknown product does not match the product associated with the scanned product identifier.

The embodiments described herein can optionally include one or more of the following features. For example, the one or more machine learning product identification models can include an n-dimensional feature model, a shape model, and a size model, the n-dimensional feature model having been trained to (i) identify features of the unknown product in the image data, (ii) map the identified features into n-dimensional space, (iii) identify clusters in the n-dimensional space, and (iv) generate output indicating n-dimensional space values for the unknown product based on the clusters, the shape model having been trained to (i) receive, as input, the image data of the unknown product, (ii) identify shape values of the unknown product in the image data, and (iii) generate output indicating at least one of the identified shape values, the size model having been trained to (i) receive, as input, the image data of the unknown product, (ii) identify size values of the unknown product in the image data, the size values including at least one of volume of the unknown product, surface area of the unknown product, quantity of pixels of the unknown product, xy coordinates of the unknown product, and xyz coordinates of the unknown product, and (iii) generate output indicating at least one of the identified size values, and the edge computing device being configured to determine that the unknown product matches the product associated with the scanned product identifier based on a determination that at least one of the (i) n-dimensional space values, (ii) at least one of the identified shape values, and (iii) at least one of the identified size values satisfies threshold matching criteria for the product associated with the scanned product identifier. In some implementations, the edge computing device can also combine (i) the n-dimensional space values, (ii) the at least one of the identified shape values, and (iii) the at least one of the identified size values into an evaluation result, determine whether the unknown product matches the product associated with the scanned product identifier based on comparing the evaluation result to an evaluation criteria for the product associated with the scanned product identifier, and return the indication of the ticket swapping event based on a determination that the evaluation result does not satisfy the evaluation criteria.

As another example, the edge computing device can also evaluate the n-dimensional space values for the unknown product against first evaluation criteria for the product associated with the scanned product identifier, evaluate the at least one of the identified shape values for the unknown product against second evaluation criteria for the product associated with the scanned product identifier, evaluate the at least one of the identified size values for the unknown product against third evaluation criteria for the product associated with the scanned product identifier, and return the indication of the ticket swapping event based on the evaluating steps. Sometimes, returning the indication of the ticket swapping event can be based on (i) the n-dimensional space values not satisfying the first evaluation criteria, (ii) the at least one of the identified shape values not satisfying the second evaluation criteria, and (iii) the at least one of the identified size values not satisfying the third evaluation criteria.

In some implementations, the POS terminal can identify the product associated with the scanned product identifier at a first time and the edge computing device can identify the plurality of candidate product identifications based on applying the one or more product identification models to the image data at a second time. The first time and the second time can be within a threshold amount of time of each other. The second time can be within a threshold amount of time after the first time.

As another example, the one or more machine learning product identification models can include a product classification model, the edge computing device can receive the product classification model from the computing system, and the computing system can train the product classification model using a process including: receiving image training data for a group of known products, training, using the image training data for the group of known products, the product classification model to identify features of each of the group of known products, mapping the image training data into n-dimensional space, where each dimension in the n-dimensional space can represent one of the identified features of each of the group of known products, identifying clusters in the n-dimensional space, where each cluster can represent at least one of the group of known products having one or more of the identified features, determining, based on the identified clusters for the at least one of the group of known products, n-dimensional space feature values for the at least one of the group of known products, and outputting the product classification model and the n-dimensional space features values for the at least one of the group of known products.

Moreover, in some implementations, determining the n-dimensional space feature values for the at least one of the group of known products can include: identifying, for each cluster, a centroid, determining, for each cluster, distances between each nearest neighbor and the centroid, and determining an aggregate n-dimensional space feature value for the at least one of the group of known products based on averaging the distances between each nearest neighbor and the centroid for each of the clusters. The image training data can include images of the group of known products taken from a group of cameras at a group of checkout lanes, where the group of cameras can have at least one of a same (i) vantage point of the known products, (ii) field of view, and (iii) lighting.

As another example, at least one of the one or more machine learning product identification models can be a product shape model that was trained to (i) receive, as input, the image data of the unknown product, (ii) identify shape values of the unknown product in the image data, and (iii) generate output indicating at least one of the identified shape values, and the edge computing device can determine that the unknown product matches the product associated with the scanned product identifier based on a determination that the at least one of the identified shape values satisfies threshold shape criteria for the product associated with the scanned product identifier.

As another example, at least one of the one or more machine learning product identification models can be a product size model that was trained to (i) receive, as input, the image data of the unknown product, (ii) identify size values of the unknown product in the image data, the size values including at least one of volume of the unknown product, surface area of the unknown product, quantity of pixels of the unknown product, xy coordinates of the unknown product, and xyz coordinates of the unknown product, and (iii) generate output indicating at least one of the identified size values, and the edge computing device can determine that the unknown product matches the product associated with the scanned product identifier based on a determination that the at least one of the identified size values satisfies threshold size criteria for the product associated with the scanned product identifier.

In some implementations, returning the indication of a ticket swapping event can include transmitting the indication to a user device of an in-store employee, the indication including instructions to monitor the user associated with the ticket swapping event. One or more of the flatbed scanning area, the vertical post, the POS terminal, and the edge computing device can be part of a checkout lane. The edge computing device can also perform product match determinations for a group of checkout lanes in a retail environment. Returning the indication of a ticket swapping event can include transmitting the indication to the POS terminal, the POS terminal further being able to stop a transaction at the POS terminal based on the determination that the unknown product does not match the scanned product identifier.

One or more embodiments described herein can also include a method for determining whether an unknown product matches a scanned barcode during a checkout process, the method including: receiving, by an edge computing device and from a camera positioned above a checkout lane, image data of an unknown product as the unknown product is moved over a flatbed scanning area at the checkout lane, retrieving, by the edge computing device and from a data store, one or more product identification models having been trained by a computing system to identify physical feature values for the unknown product from the image data, where the one or more machine learning product identification models can include an n-dimensional feature model, a shape model, and a size model, identifying, by the edge computing device, one or more physical feature values for the unknown product based on applying the one or more product identification models to the image data, determining, by the edge computing device, whether the unknown product matches a product associated with a product identifier that was scanned at the checkout lane based on a determination that at least one of the one or more physical feature values for the unknown product satisfies threshold matching criteria for the product associated with the scanned product identifier, and returning, by the edge computing device, an indication of a ticket swapping event based on a determination that the unknown product does not match the product associated with the scanned product identifier. Returning the indication of the ticket swapping event can include transmitting the indication of the ticket swapping event to a point of sale (POS) terminal at the checkout lane, the POS terminal being able to stop a transaction performed at the checkout lane based on the determination that the unknown product does not match the product associated with the scanned product identifier.

The method can optionally include one or more of the abovementioned features. Moreover, the method can optionally include one or more of the following features. For example, the one or more physical feature values can include, for the unknown product, at least one of (i) n-dimensional space values, (ii) shape values, and (iii) size values. The method can also include determining, by the edge computing device, that the unknown product does not match the product associated with the scanned product identifier based on a determination that none of (i)-(ii) satisfy the threshold matching criteria.

One or more embodiments described herein include a system for determining whether an unknown product matches a scanned barcode during a checkout process, the system including a computing system that generates one or more machine learning product identification models for identifying unknown products from image training data and a checkout lane. The checkout lane can include a flatbed scanning area that receives one or more products to be purchased by a user, the flatbed scanning area including one or more scanning devices and cameras, a vertical post positioned proximate the flatbed scanning area, the vertical post including an overhead camera having a field of view that includes the flatbed scanning area, and a point of sale (POS) terminal. The overhead camera can capture image data of an unknown product as it is moved over the flatbed scanning area. The POS terminal can scan, using one or more of the scanning devices and cameras, a product identifier of the unknown product, identify, based on the scanned product identifier, a product associated with the scanned product identifier, and transmit, to an edge computing device, information about the product associated with the scanned product identifier. The checkout lane can also include an edge computing device that can determine whether the unknown product matches the product associated with the scanned product identifier. The edge computing device can receive, from the overhead camera, the image data of the unknown product, retrieve, from a data store, one or more of the product identification models, identify a plurality of candidate product identifications for the unknown product based on applying the one or more product identification models to the image data, and determine based on the plurality of candidate product identifications, whether the unknown product matches the product associated with the scanned product identifier.

The system can optionally include one or more of the following features. For example, the edge computing device can transmit a notification to the POS terminal to complete a transaction during the checkout process based on determining that the unknown product matches the product associated with the scanned product identifier. The edge computing device can also transmit a notification to a user device of an in-store employee that the checkout process likely involves ticket swapping based on determining that the unknown product does not match the product associated with the scanned product identifier.

Sometimes, the product identifier can be a barcode, QR code, SKU, label, or sticker. The vertical post can also include a light positioned above the overhead camera, the light providing uniform and consistent lighting to the overhead camera. Moreover, a plurality of the checkout lanes can be installed in a network of stores.

As another example, the image training data can include images of a plurality of known products taken from a plurality of overhead cameras at a plurality of checkout lanes. The plurality of overhead cameras can have at least one of a same (i) vantage point of the known products, (ii) field of view, and (iii) lighting.

Sometimes, the POS terminal can identify the product associated with the scanned product identifier at a first time and the edge computing device can identify the plurality of candidate product identifications at a second time. The first time can be the same as the second time. The first time may be earlier than the second time. The first time may be later than the second time.

As another example, the product identification models can include a product classification model, and the computing system can receive image training data of a plurality of known products, train, using the image training data, the product classification model to identify features of each of the plurality of known products, map, based on the identified features, the image training data into n-dimensional space, identify clusters in the n-dimensional space, determine, based on the identified clusters, n-dimensional space values for each of the known products, and output the product classification model and the n-dimensional space values for each of the known products. Each dimension in the n-dimensional space can represent one of the identified features. Each of the clusters can represent one or more known products having one or more of the identified features. Moreover, sometimes, determining the n-dimensional space values for each of the known products can include identifying, for each of the clusters, a centroid, determining, for each of the clusters, distances between each nearest neighbor and the centroid, and determining an aggregate n-dimensional space value for the known product based on averaging the distances between each nearest neighbor and the centroid for each of the clusters.

As yet another example, the product identification models can include a plurality of product-based identification models, and the computing system can receive image training data of a plurality of known products, select a first subset of the image training data that identifies a particular known product and a second subset of the image training data that identifies other known products that do not include the particular known product, train an identification model for the particular known product to identify the particular known product, and output the identification model for the particular known product. Moreover, the computing system can generate a product-based identification model for each of the known products identified in the image training data.

As yet another example, the edge computing device can identify the unknown product as a likely match for the scanned product identifier based on determining that any of the candidate product identifications match the scanned product identifier. The edge computing device can also identify the unknown product as a likely mismatch for the scanned product identifier based on determining that none of the candidate product identifications match the scanned product identifier.

One or more embodiments described herein can include a system for determining whether an unknown product matches a scanned barcode in n-dimensional space. The system can include a computing system that can generate a product classification model for identifying unknown products from image data. The computing system can receive, from cameras positioned at a plurality of checkout lanes in a plurality of stores, image training data for a plurality of known products, train, using the image training data, the product classification model to map visual features of the known products into multi-dimensional feature space, and determine feature space values for each of the plurality of known products based on applying the product classification model to the image training data. The system can also include an edge computing device that can determine whether an unknown product matches a product associated with a scanned product identifier. The edge computing device can receive, from a camera at a checkout lane in a store, image data of an unknown product that is scanned by a user during a checkout process, receive, from the computing system, the product classification model, generate a multi-dimensional space value for the unknown product based on applying the product classification model to the image data, and identify one or more candidate product identifications for the unknown product based on comparing the multi-dimensional space value for the unknown product with the feature space values for each of the plurality of known products.

The system can optionally include one or more of the following features. For example, the edge computing device can output the one or more candidate product identifications. The edge computing device can also rank the one or more candidate product identifications from highest to lowest multi-dimensional space value, receive, from a scanning device at the checkout lane, a product identifier of the unknown product that was scanned by the user, determine whether any of the ranked candidate product identifications match the product identifier, and return a determination of whether any of the ranked candidate product identifications match the product identifier.

As another example, the edge computing device can also identify the unknown product as a likely match for the product identifier based on determining that any of the ranked candidate product identifications match the product identifier. Sometimes, the edge computing device can identify the unknown product is a likely mismatch for the product identifier based on determining that none of the ranked candidate product identifications match the product identifier. The edge computing device can also identify the unknown product as a top ranked candidate product identification amongst the ranked candidate product identifications.

One or more embodiments described herein can also include a system for determining whether an unknown product matches a scanned barcode using product-based identification models. The system can include a computing system that can generate product-based identification models for each known product. The computing system can receive annotated image training data for a plurality of known products, and train, using the image training data, product-based identification models for each of the plurality of known products. The system can also include an edge computing device that can determine whether an unknown product matches a product associated with a scanned product identifier. The edge computing device can receive, from a camera at a checkout lane in a store, image data of an unknown product that is scanned by a user during a checkout process, receive, from the computing system, one or more of the product-based identification models, determine, based on applying the one or more product-based identification models to the image data, confidence values that the unknown product is one or more of the plurality of known products identified by the one or more product-based identification models, and identify one or more candidate product identifications for the unknown product based on comparing the confidence values for the unknown product.

The system can optionally include one or more of the following features. The edge computing device can also select one or more of the candidate product identifications for the unknown product having confidence values exceeding a threshold value. Identifying the one or more candidate product identifications can include ranking the confidence values for the unknown product from highest to lowest confidence value.

As another example, the edge computing device can also receive, from a scanning device at the checkout lane, a product identifier of the unknown product that was scanned by the user, determine whether any of the candidate product identifications match the product identifier, and return a determination of whether any of the ranked candidate product identifications match the product identifier. Sometimes, the edge computing device can also identify the unknown product as a likely match for the product identifier based on determining that any of the candidate product identifications match the product identifier. Sometimes, the edge computing device can identify the unknown product is a likely mismatch for the product identifier based on determining that none of the candidate product identifications match the product identifier. Moreover, the edge computing device can identify the unknown product as a candidate product identification having the highest confidence value.

One or more embodiments described herein can also include a system for determining whether an unknown product matches a scanned barcode during a checkout process, the system having a computing system that can generate one or more machine learning product matching models for identifying unknown products from image training data, and a checkout lane. The checkout lane can include a flatbed scanning area that can receive one or more products to be purchased by a user, the flatbed scanning area including one or more scanning devices and cameras, a vertical post positioned proximate the flatbed scanning area, the vertical post including an overhead camera having a field of view that includes the flatbed scanning area, the overhead camera being able to capture image data of an unknown product as it is moved over the flatbed scanning area, a point of sale (POS) terminal, and an edge computing device. The POS terminal can scan, using one or more of the scanning devices and cameras, a product identifier of the unknown product, identify, based on the scanned product identifier, a product associated with the scanned product identifier, and transmit, to an edge computing device, information about the product associated with the scanned product identifier. The edge computing device can determine whether the unknown product matches the product associated with the scanned product identifier. Thus, the edge computing device can receive, from the overhead camera, the image data of the unknown product, retrieve, from a data store, one or more of the product matching models, identify a plurality of candidate product identifications for the unknown product based on applying the one or more product matching models to the image data, and determine based on the plurality of candidate product identifications, whether the unknown product matches the product associated with the scanned product identifier.

The system can optionally include one or more of the following features. For example, the one or more product matching models can include a classification model and one or more product identification models. The edge computing device can determine which of the one or more product matching models to retrieve from the data store based on whether the product associated with the scanned product identifier historically has been involved in a quantity of ticket switching events that exceeds a threshold level. Moreover, the edge computing device can determine which of the one or more product matching models to retrieve from the data store based on whether a price of the product associated with the scanned product identifier is less than a threshold price. Sometimes, the edge computing device can determine which of the one or more product matching models to retrieve from the data store based on which of the one or more product matching models historically has most accurately identified the product associated with the scanned product identifier.

The devices, system, and techniques described herein may provide one or more of the following advantages. For example, the disclosed technology can be used to detect whether a customer engaged in ticket swapping in a retail environment, such as a store. Using the techniques described herein, the disclosed technology can determine, on the edge, whether a product that the customer is purchasing actually matches the product label that was scanned. Such a determination can be made quickly using machine learning models that have been trained with robust training datasets, thereby improving accuracy in product identification and matching determinations. If a determination is made that the product does not match the scanned label, then asset protection (AP) can be notified of this ticket swapping incident. AP can respond accordingly, whether it be apprehending the customer before the customer leaves the store and/or monitoring the customer when they return to the store in the future. As a result of the disclosed technology, ticket swapping incidents can be identified and appropriate action can be taken to resolve or otherwise stop ticket swapping from occurring.

As another example, the disclosed technology can be used to determine what the imaged product most likely is when the imaged product does not match the scanned label. One or more machine learning models described herein can be used to determine probabilities of what the imaged product actually is. When a determination is made that the imaged product does not match the scanned label, the disclosed technology can be used to determine a most likely identification of the imaged product. For example, the machine learning models can output confidence values indicating how likely the imaged product is to be one of one or more different products. The confidence values can be sorted to determine which of the different products has the highest confidence value. The disclosed technology can then determine that the imaged product is most likely the product with the highest confidence value. This information can be useful to determine a gravity of the customer's ticket swapping. For example, this information can be used to determine whether the customer is paying a price that is significantly less than the actual price of the product that is being purchased. The gravity of the customer's ticket swapping can cause AP to respond in a particular way. For example, AP may apprehend a customer who engages in a serious ticket swapping (e.g., the customer purchases a set of headphones but put a gum label on the headphones, thereby paying a price of the gum instead of an actual price of the headphones) but may monitor a customer over time who engages in a less serious ticket swapping (e.g., the customer purchases a bag of chips but puts a discounted candy label on the bag of chips, thereby paying the discounted price of the candy instead of the actual price of the bag of chips). This information can also be used by the POS terminal to update the customer's bill to reflect the actual price of the product that is being purchased, rather than the price that is associated with the scanned label. The disclosed techniques can therefore deter customers from ticket swapping and can assist AP in monitoring ticket swapping incidents.

As another example, the disclosed technology can provide for lightweight processing on the edge. As described herein, each checkout lane can include an edge computing device configured to apply one or more machine learning models to image data of products that are being scanned. The edge computing device can identify the products in the image data and determine whether the imaged products match the scanned barcodes. Performing such processes on the edge at each edge computing device can utilize less computational resources than performing such processes at a remote computing system in communication with checkout lanes in one or multiple stores. As a result, the disclosed technology can increase overall computational efficiency and avoid clogging network bandwidth. The disclosed technology can also be advantageous to allow for quicker determinations regarding product identification and matching.

Moreover, the disclosed technology can be used to build accurate machine learning models from robust training datasets. Image data can be collected from a plurality of cameras at checkout lanes in one or more stores. The image data can be used by a remote computing system to train one or more machine learning models to identify imaged products. The machine learning models can then be deployed at each edge computing device at checkout lanes in the one or more stores. Product identification and matching determinations made by any of the edge computing devices can also be used by the remote computing system to continuously improve the machine learning models. As a result, the machine learning models can more accurately identify products from a variety of image data.

Similarly, the disclosed technology can provide for improved data capture, which can be beneficial to train the machine learning models. Cameras can be similarly configured and positioned at checkout lanes across different stores. Thus, the cameras can capture consistent, higher resolution images and maintain uniform fields of view (FOV). The images captured by such cameras can have uniform lighting and angles that can make training machine learning models both easier and more accurate. The captured images can therefore build robust and uniform training datasets of imaged products. These training datasets can then be used by the remote computing system to train the machine learning models to more accurately identify products from image data.

The details of one or more implementations are set forth in the accompanying drawings and the description below. Other features and advantages will be apparent from the description and drawings, and from the claims.

BRIEF DESCRIPTION OF THE DRAWINGS

Like reference symbols in the various drawings indicate like elements.

DETAILED DESCRIPTION OF ILLUSTRATIVE EMBODIMENTS

This document relates to determining whether a product label that has been scanned is incorrect for a scanned product. The disclosed technology can be used to identify situations when a customer engages in ticket swapping (e.g., replacing a barcode of one product with a barcode of another product). The disclosed technology can also be used to identify what product the customer is likely purchasing when a determination is made that the product being purchased does not match the scanned product label. One or more machine learning models can be used to identify products that are being purchased. For example, a classification model can be used, in which image data of a scanned product is mapped into n-dimensional space. Vector values for features in the image data can be determined and analyzed in comparison to known vector values of features for a variety of different products. The disclosed technology can therefore determine a likelihood that the scanned product is one of the variety of different products. As another example, one or more product identification models can be applied to the image data of the scanned product. Each of the product identification models can be trained to identify a different product.

Using the techniques described herein, the disclosed technology can provide for ways to prevent ticket swapping from occurring and/or to apprehend or otherwise monitor customers who engage in ticket swapping.

Figure 1:
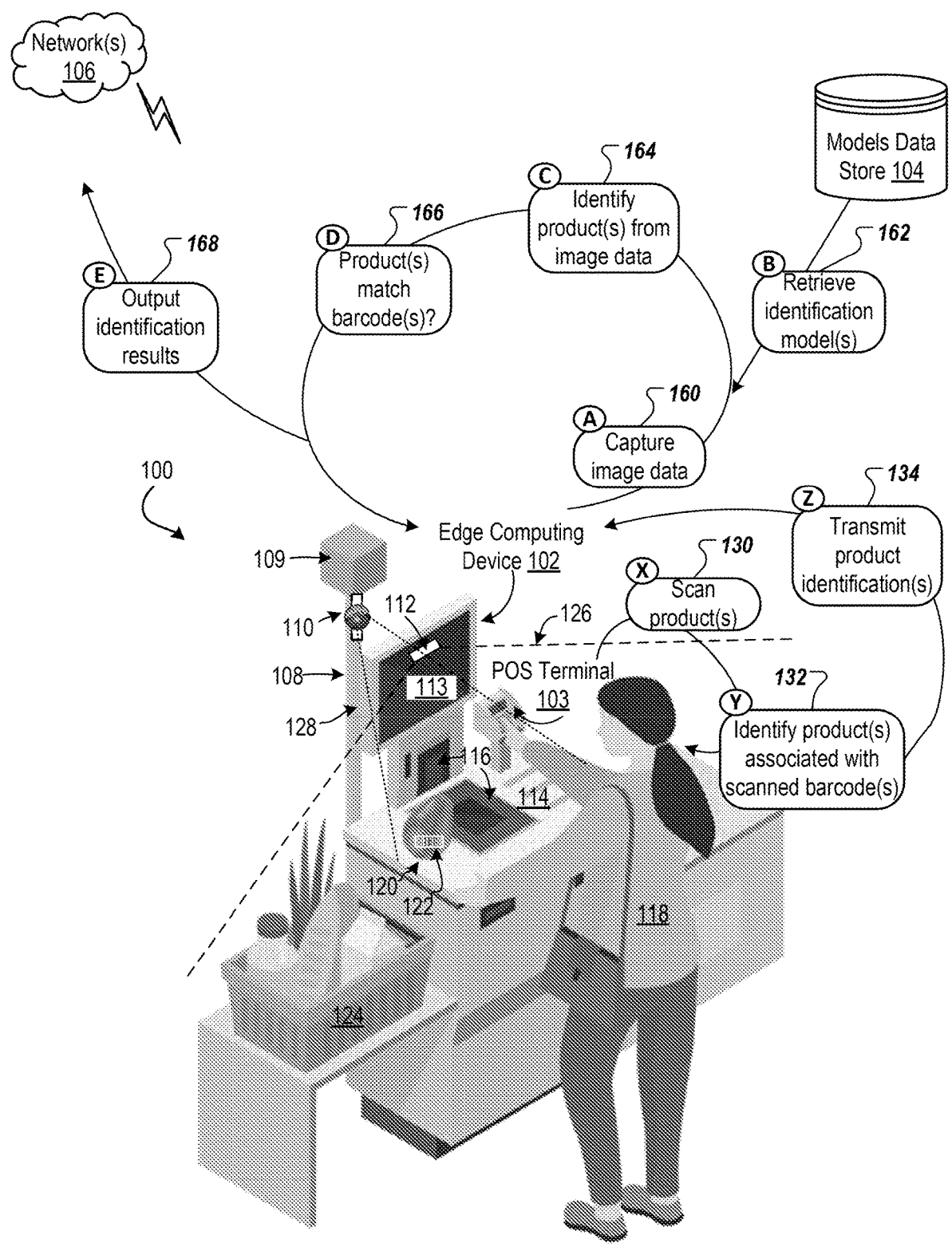
FIG. 1 is a conceptual diagram of a checkout process using the techniques described herein.

Referring to the figures, FIG. 1 is a conceptual diagram of a checkout process using the techniques described herein. A checkout lane 100 can include a flatbed 114, one or more scanning devices 116, a point of sale (POS) terminal 103, an edge computing device 102, and a light pole 108. A retail environment, such as a grocery store, can include multiple checkout lanes 100 that customers, such as customer 118, can use to go through a self-checkout process.

The one or more scanning devices 116 can be integrated into the flatbed 114. For example, the flatbed 114 can include one or more cameras or other imaging devices. In such scenarios, the cameras or other imaging devices can be configured to capture images of products as the customer 118 scans them. These images can be used, as described further below, to identify products that are being purchased by the customer 118. Such images can also be used to train and/or improve one or more machine learning models that can be used to identify the products. Moreover, the flatbed 114 can also include an integrated scale that can be used to weight products as they are placed on the flatbed 114.

The one or more scanning devices 116 can be barcode, SKU, or other label identifying devices. The scanning devices 116 can also be LiDAR, infrared, and one or more other types of scanning devices and/or flatbed scanners. For example, the one or more scanning devices 116 can include a handheld scanner that the customer 118 can direct towards a label, such as a barcode, attached to a product that the customer 118 is purchasing. Moreover, the handheld scanner can include a camera that captures images of the product as it is being scanned by the customer 118.

The POS terminal 103 can be configured to identify products that are scanned using the one or more scanning devices 116. For example, the POS terminal 103 can receive a scan of a product label from the one or more scanning devices 116. Using the scan of the product label, the POS terminal 103 can determine a price of the product associated with the label. The POS terminal 103 can add the determined price to the customer 118's bill (e.g., transaction, receipt).

As depicted in FIG. 1, the edge computing device 102 can include a display screen 113. The display screen 113 can output information about the customer 118's transaction. For example, the display screen 133 can output scanned products and their associated prices in real-time, as the customer 118 scans the products. The display screen 113 can also be a touchscreen. The customer 118 can, for example, input information at the display screen 113 about products being purchased, such as a quantity and/or weight of such products. The customer 118 can also use the display screen 113 to look up products that the customer 118 is purchasing (e.g., fresh produce that may not have barcodes or other identifying labels attached to them). When the customer 118 is done scanning products, the customer 118 can complete their purchase by paying at the POS terminal 103. The edge computing device 102, the POS terminal 103, and the display screen 113 can be part of the same or separate devices. For example, the POS terminal 103 can be integrated with the display screen 113. In another example, the display screen 113 can be separate from the edge computing device 102. In a further example, the display screen 113 can be separate from both the POS terminal 103 and the edge computing device 102. Other configurations are also possible.

The display screen 113 can also include an integrated camera 112. Images captured by the camera 112 can be used to identify the customer 118 (e.g., by a remote computing system, such as computing system 302 described further below), especially in scenarios where the customer 118 engages in ticket swapping. Once the customer 118 is identified, Asset protection (AP) can use the images captured by the camera 112 to objectively identify the customer 118 before they leave the store and/or when the customer 118 returns to the store in the future. Images captured by the integrated camera 112 can also be used to objectively identify characteristics of the customer 118 that can be used to identify the customer 118, such as body movements and appearance. For example, the integrated camera 112 can have a wide FOV 126 such that the camera 112 can capture a view of a surrounding area to provide more context in subsequent image analysis.

The edge computing device 102 can be configured to make real-time determinations of product identification and product-to-label matching. As described herein, the edge computing device 102 can deploy one or more machine learning models to identify a product from image data that is captured by one or more cameras at the checkout lane 100. The edge computing device 102 can therefore quickly and accurately determine what product is being scanned by the customer 118 and whether that product matches the scanned label. Such real-time determinations made at the edge can utilize less computational resources and avoid clogging network bandwidth.

The light pole 108 can include a camera 110 and a light 109. The camera 110 can face down over the flatbed 114, having a field of view (FOV) 128. The camera 110 can be a high resolution camera. For example, the camera 110 can have 1920×1080 resolution. The light 109 can provide consistent lighting over the flatbed 114 area. The camera 110 can be configured to capture images of products as they are scanned by the scanning devices 116 or otherwise passed over the flatbed 114. These images can be used for identifying a product that the customer 118 is purchasing in real-time. Moreover, these images can be used to build a robust image training dataset that can be used to train and improve one or more machine learning models used for product identification.

As mentioned throughout this disclosure, each checkout lane 100 in each retail environment can have the same configuration of the camera 110 attached to the light pole 108. Therefore, images captured by any camera 110 at any checkout lane 100 can have uniform FOV and lighting. Such consistent image data can be beneficial to train machine learning models to more accurately identify products from the image data, as will be described further below. For example, with consistent FOV and lighting, features of a product can be more clearly differentiated from an ambient environment in the image data. These features can be labeled and confidence of such labeling can increase since the image data can be associated with a timestamp of a correct barcode scan at the POS terminal 103.

To begin the checkout process at the checkout lane 100, the customer 118 can place a shopping basket 124 or shopping cart next to the checkout lane 100. The customer 118 can remove products from the basket 124, such as avocado 120, and pass such products over the flatbed 114. The flatbed 114 can include the one or more scanning devices 116, which can be configured to scan images of product labels, such as barcode 122 on the avocado 120. Thus, the customer 118 can scan the avocado 120's barcode 122 at the POS terminal 103 using the one or more scanning devices 116 (step X, 130). The POS terminal 103 can identify the product associated with the scanned barcode 122 (step Y, 132). For example, the POS terminal 103 can look up, in a data store, a product that corresponds to the scanned barcode. The POS terminal 103 can also transmit the scanned barcode to another computing system (e.g., the edge computing device 102 and/or a remote computing system) to determine what product corresponds to the scanned barcode. The other computing system can then transmit the product information to the POS terminal 103.

Once the product associated with the barcode 122 is identified, the POS terminal 103 can update the customer 118's bill with a price of the associated product. The updated bill can be outputted on the display screen 113. In the example of FIG. 1, once the barcode 122 is scanned (step X, 130), the POS terminal 103 may identify that a red bell pepper is associated with the scanned barcode 122 in the data store by performing a lookup function (step Y, 132). As a result, a price associated with the red bell pepper can be outputted at the display screen 113, even though the customer 118 is purchasing the avocado 120. The customer 118 may have swapped the actual barcode of the avocado 120 with the barcode 122 of the red bell pepper.

As another example, when the barcode 122 is scanned (step X, 130), the POS terminal 103 can identify that an avocado (such as the avocado 120) is associated with the scanned barcode 122 by performing the lookup function in the data store (step Y, 132). The price associated with the avocado 120 can be outputted for display at the display screen 113. In this example, the customer 118 did not engage in ticket swapping since the scanned barcode 122 matches the avocado 120 that is stored in the data store.

The customer 118 can continue scanning barcodes or other product labels until the basket 124 is empty (steps X-Y can be repeated). The POS terminal 103 can transmit the product identifications to the edge computing device (step Z, 134). For example, the POS terminal 103 can transmit all the product identifications once all the products are scanned and identified. In another example, the POS terminal 103 can transmit the product identifications as they are made in real-time. Other configurations are also possible.

The edge computing device 102 can be configured to determine whether the products that the customer 118 is purchasing match scanned barcodes. Thus, the edge computing device 102 can capture image data (step A, 160). The image data can be videos and/or still images. For example, the edge computing device 102 can instruct one or more of the camera 110, the camera 112, and one or more additional cameras on the flatbed 114 to capture image data of the products as they are being scanned and passed over the flatbed 114. The edge computing device 102 can then receive the image data from the cameras. For example, the cameras, such as the camera 110, can automatically capture image data and transmit the image data to the edge computing device 102. The image data can be transmitted to the edge computing device 102 in real-time, as such images are captured. For example, the image data can be transmitted to the edge computing device 102 at predetermined time intervals. In yet some implementations, the image data can be transmitted to the edge computing device 102 after a product is scanned and the customer 118 moves on to scanning another product.

The edge computing device 102 can retrieve one or more product identification models from a models data store 104 (step B, 162). For example, the edge computing device 102 can retrieve a machine learning classification model, as described further in reference to FIGS. 3-5. As another example, the edge computing device 102 can retrieve one or more machine learning product identification models, as described further in reference to FIGS. 6-7. Sometimes, the edge computing device 102 can retrieve the classification model but not one or more of the product identification models. Sometimes, the edge computing device 102 can retrieve one or more product identification models but not the classification model. Moreover, sometimes the edge computing device 102 can retrieve both the classification model and one or more of the product identification models. The retrieved models can be used and then output from such models can be compared to identify most accurate results. As a default, the edge computing device 102 can be configured to retrieve the classification model, especially since retrieving and using the product identification model(s) may be more computationally intensive in some scenarios. As another example, the edge computing device 102 can decide which model or models to retrieve based on a SKU that is scanned. Once the SKU is identified, the model or models can be retrieved that historically have been more accurate for that particular SKU. The edge computing device 102 can also decide which model or models to retrieve based on which products that are scanned are most commonly involved in ticket switching and which of the models more accurately identify such products. Machine learning (ML) monitoring can be used to determine how often mismatches are identified across all stores. The edge computing device 102 can use historic and real-time mismatch information in order to select a model or models that can provide most accurate results at a present time.

In some implementations, the edge computing device 102 can retrieve models for identifying n-dimensional space features, size, and/or shape of the product(s) in the image data (block B, 162). Any combination of such models can be retrieved from the models data store 104.

Figure 7:
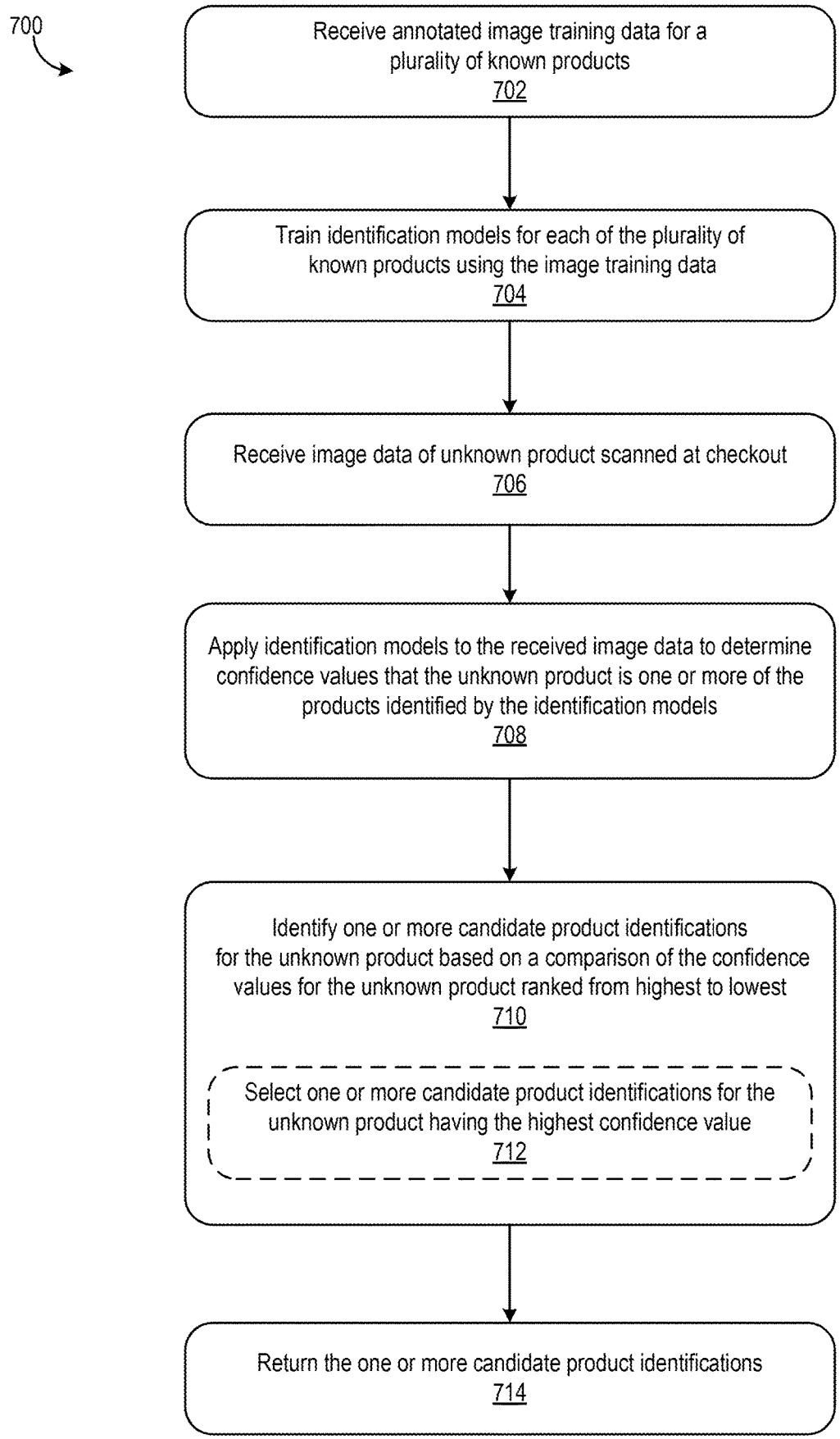
FIG. 7 is a flowchart of a process for identifying a product using one or more of the machine learning product identification models.

Using the one or more retrieved models, the edge computing device 102 can identify the product(s) that appear in the image data (step C, 164) (refer to FIGS. 4 and 7). In some implementations, identifying the product(s) can include applying one or more of the models to the image data to identify n-dimensional space feature values for the product(s) that appear in the image data. In addition or alternatively, one or more of the models can be applied to the image data to identify shape values for the product(s) that appear in the image data. In addition or alternatively, one or more of the models can be applied to the image data to identify size values for the product(s) that appear in the image data. For example, an n-dimensional space model can be applied. A shape model can be applied. A size model can be applied. Any combination of such models can also be applied in step C (164).

The edge computing device 102 can then determine whether the product(s) identified from the image data matches the scanned barcode(s) (step D, 166). For example, once the edge computing device 102 determines n-dimensional space feature values, shape values, and/or size values for the product(s) appearing in the image data, the edge computing device 102 can determine whether any combination of such values satisfy threshold matching criteria for a product that corresponds to the scanned barcode(s). As an illustrative example, if any of the n-dimensional space feature values, the shape values, and the size values determined by applying the models matches (or are within a threshold range of) n-dimensional space feature values, shape values, and/or size values for the product represented by the scanned barcode, the edge computing device 102 can determine that the product(s) in the image data matches the scanned barcode(s). As another illustrative example, if each of the n-dimensional space feature values, the shape values, and the size values determined by applying the models matches (or are within a threshold range of) n-dimensional space feature values, shape values, and size values for the product represented by the scanned barcode, the edge computing device 102 can determine that the product(s) in the image data matches the scanned barcode(s). As yet another illustrative example, if any of the n-dimensional space feature values, the shape values, and the size values determined by applying the models does not match (or does not fall within a threshold range of) n-dimensional space feature values, shape values, and/or size values for the product represented by the scanned barcode, the edge computing device 102 can determine that the product(s) in the image data likely do not match the scanned barcode(s)—thus, a ticket switching event likely occurred. One or more other techniques of assessing and/or combining the values described herein can also be performed by the edge computing device 102 in order to determine whether there is a product match or mismatch.

As another example, and still referring to step D (166), the edge computing device 102 can receive the product identification(s) from the POS terminal 103 (step Z, 134) at any time before step D (166). The transmitted product identification(s) can include the scanned barcode(s). The transmitted product identification(s) can also include information about the product(s) associated with the scanned barcode(s). The edge computing device 102 can compare the transmitted product identification(s) to the product(s) identified from the image data to determine whether they match (step D, 166). As an example, when the edge computing device 102 identifies the product from the image data (step C, 164), the applied identification model(s) can output confidence values indicating a likelihood that the product is one or more known products (e.g., based on the product having one or more n-dimensional space feature values, shape values, and/or size values within threshold value ranges associated with the one or more known products). In step D (166), the edge computing device 102 can determine whether any of the confidence values (e.g., a highest confidence value and/or one or more of the highest confidence values) are associated with a known product that corresponds to the scanned barcode(s) or otherwise satisfy threshold confidence values to likely be associated with the known product that corresponds to the scanned barcode(s). If any of the confidence values associated with the known products correspond to the scanned barcode(s), then the edge computing device 102 can determine that the imaged product(s) matches the scanned barcode(s) (step D, 166). If any of the confidence values associated with the known products do not correspond to the scanned barcode(s), then the edge computing device 102 can determine that the imaged product(s) likely does not match the scanned barcode(s) and that ticket switching likely occurred.

In the example depicted in FIG. 1, where the POS terminal 103 identifies the barcode 122 to be associated with a red bell pepper, the edge computing device 102 can apply one or more identification models to image data of the avocado 120 (step C, 164). The edge computing device 102 can identify the avocado 120 as an avocado based on application of the one or more identification models. The one or more identification models, as described herein, can be trained to identify n-dimensional space feature values of the avocado 120, shape values of the avocado 120, and/or size values of the avocado 120. In some implementations, the edge computing device 102 can identify one or more candidate products that the avocado 120 may be based on output from the one or more applied identification models. The candidate products can include an avocado, a lime (e.g., size and shape values for the avocado 120 may be within threshold ranges of expected size and shape values for limes), and a green bell pepper (e.g., n-dimensional space feature values for the avocado 120 may be within a threshold n-dimensional space feature cluster associated with green bell peppers). Based on application of the one or more identification models, the edge computing device 102 can also assign confidence values to each of these candidate product identifications. For example, the avocado can have the highest confidence value. The lime can have the lowest confidence value (e.g., because the avocado 120 in the image data appears larger in size relative to an ambient environment than a lime would be in the same ambient environment and a green color of the avocado 120 can be darker than that of the lime). The green bell pepper can be assigned a confidence value between those of the avocado and the lime (e.g., because the avocado 120 in the image data can appear closer in size to the green bell pepper and can be a same color, but they can be different shapes).

The edge computing device 102 can determine whether the imaged product matches the scanned barcode that is associated with the red bell pepper by comparing the confidence values of the candidate product identifications to confidence value(s) for the red bell pepper (step D, 166). The edge computing device 102 can start with the highest confidence value and determine whether that matches or is close to the confidence value(s) for the red bell pepper. The edge computing device 102 can do this for each of the candidate product identifications. Since none of the confidence values align with the confidence value(s) of the red bell pepper, the edge computing device 102 can determine that the imaged product does not match the scanned barcode 122. In some implementations, the edge computing device 102 can also determine that the imaged product is likely the candidate product identification with the highest confidence value. In this example, the edge computing device 102 can determine that the imaged product is likely an avocado (which had the highest confidence value), rather than the red bell pepper associated with the barcode 122 that the customer 118 scanned.

The edge computing device 102 can output identification results (step E, 168). The identification results can indicate whether the imaged product(s) matches the product barcode(s). The identification results can indicate whether the imaged product(s) is a mismatch for the product barcode(s) that was scanned. In some implementations, the identification results can also include one or more candidate product identifications and/or a most likely candidate product identification for the imaged product(s). The edge computing device 102 can transmit the identification results to a computing device of asset protection (AP) personnel. AP can use the identification results to determine appropriate action to take with regards to the customer 118. For example, if the edge computing device 102 identifies a mismatch between the scanned barcode(s) and the imaged product(s), AP can determine that the customer 118 engaged in ticket swapping.

AP can also determine a gravity or seriousness of the ticket swapping. As an illustrative example, AP can find ticket swapping more serious if the customer 118 swapped a barcode of a TV with a barcode of a chair, where the chair is considerably less expensive than the TV. On the other hand, AP can find ticket swapping less serious if the customer 118 swapped a barcode of a bag of trail mix with a barcode of a pack of gum, where the pack of gum is less expensive than the bag of trail mix. In the example depicted in FIG. 1, AP can find the customer 118's swap of a barcode for the avocado 120 with the barcode 122 of the red bell pepper as less serious, especially if the avocado 120 and the red bell pepper are similar in price. AP may decide not to stop the customer 118. Instead, AP may decide to monitor the customer 118 whenever they return to the store in the future to see whether the customer 118 engages in ticket swapping and/or more serious ticket swapping.

AP can also receive image data captured by the camera 112 embedded in the display screen 113. Using such image data, AP can objectively identify the customer 118 so that AP can apprehend and/or monitor the customer 118.

Steps A-E may be performed in real-time for each product as it is scanned at the checkout lane 100. For example, one or more of the steps A-E can be performed at one time after all the products are scanned at the checkout lane 100. Since product identification and matching is performed at the edge, determinations of whether the customer 118 is engaging in ticket swapping can be made faster and by using less computational resources.

Steps X-Z may be performed at the POS terminal 103 in parallel with steps A-C at the edge computing device 102. For example, steps X-Z can be performed before steps A-C. In yet other implementations, steps A-C can be performed before steps X-Z. One or more of the steps X-Z and A-C can be performed at same or different times during a checkout process.

Moreover, although this disclosure generally describes the disclosed technology as being performed by the edge computing device 102, the disclosed technology can also be performed by any other system or device, including but not limited to a cloud-based system, service, or server, a node system, a computing system, a network of devices, etc. Sometimes, one or more of the steps described in reference to FIG. 1 can be performed locally, such as at the edge computing devices 102. This can be beneficial when the steps are latency sensitive. One or more of the steps described in reference to FIG. 1 can also be performed remotely and/or distributed to other systems, devices, cloud-based services, etc. Steps can be performed remotely and/or distributed when they are not latency sensitive steps.

Figure 2:
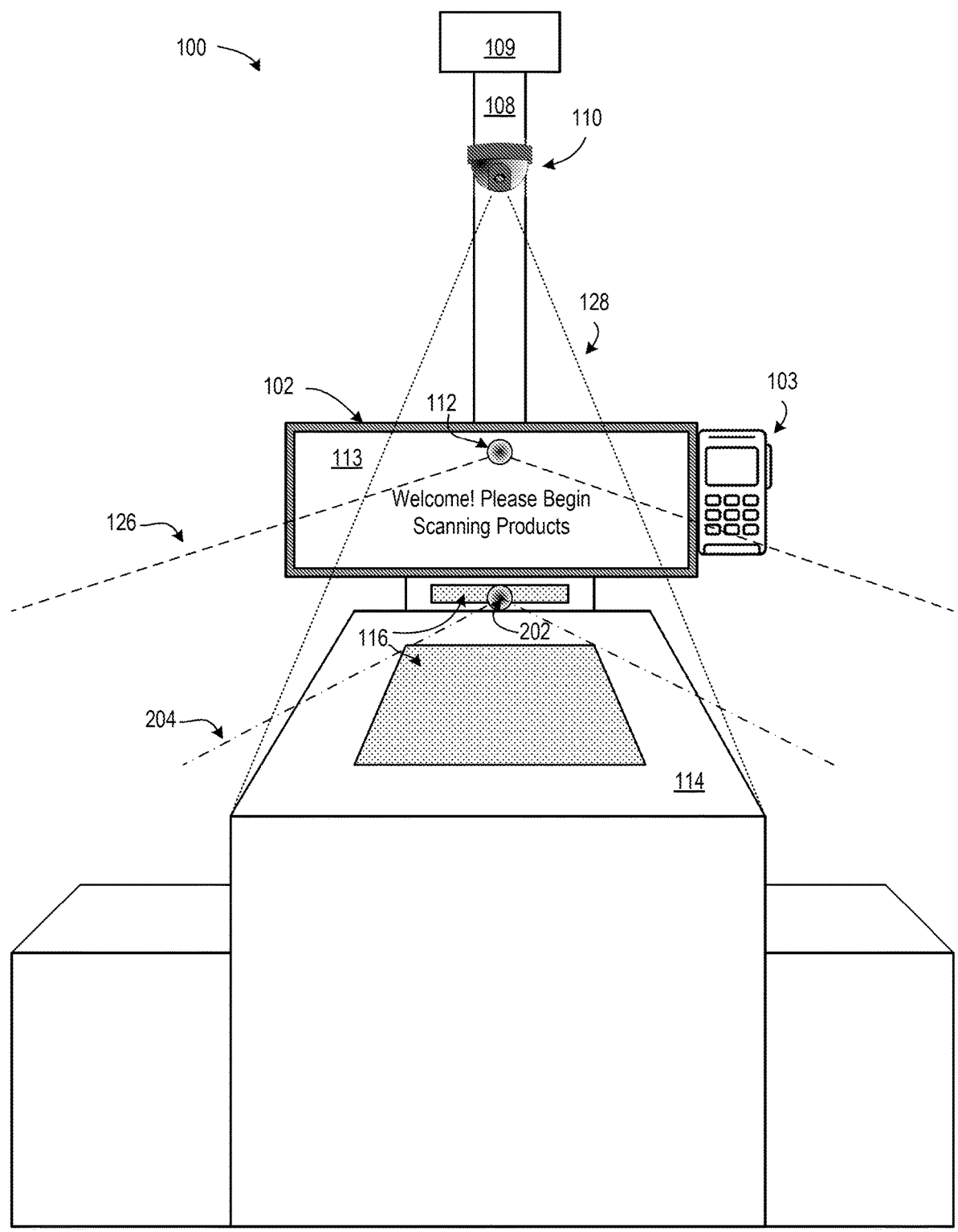
FIG. 2 is an example checkout lane.

FIG. 2 is an example checkout lane 100. As depicted and described throughout, the checkout lane 100 can include the edge computing device 102, the POS terminal 103, the light pole 108, the display screen 113, the flatbed 114, and the one or more scanning devices 116.

The light pole 108 can include the light 109 and the camera 110. As described herein, the camera 110 can have a top down field of view (FOV) 128 of the flatbed 114. The camera 110 can capture uniform images and/or videos of the flatbed 114. The light 119 can also provide consistent lighting for the camera 110 to capture clear image data of the flatbed 114 and products thereon. The consistent lighting can be advantageous for labeling training datasets of products and identifying products from image data during a checkout process.

The display screen 113 can include the discretely embedded camera 112. The camera 112 can continuously monitor an area surrounding the checkout lane 100. The camera 112 can capture images and/or videos of a customer during the checkout process. This image data can be used to objectively identify a customer who engages in ticket swapping. The camera 112 can have a wide FOV 126 such that the camera 112 can capture activity in the area surrounding the checkout lane 100 to provide context. The FOV 126 can be on a horizontal plane parallel to a top surface of the flatbed 114. For example, the camera 112 can be angled upwards relative to the horizontal plane such that it can capture image data of customers of varying heights. In other words, a tall customer's head may not be cut off in the image data.

The flatbed 114 can also include a flatbed camera 202. The flatbed camera 202 can have a FOV 204, which can be on a horizontal plane parallel to a top surface of the flatbed 114. For example, the flatbed camera 202 can be angled upwards relative to the horizontal plane such that the flatbed camera 202 can capture image data of a bottom or underside of products as they are scanned by the scanning devices 116 or otherwise moved across the flatbed 114. The flatbed camera 202 can be configured to capture close-up images and/or videos of a product, regardless of whether a product label is visible on the product in that image data.

The image data captured by the flatbed camera 202 can be used for training one or more machine learning models described herein. For example, a quantity of consecutive images (e.g., 15 images) can be captured by the flatbed camera 202 as a product is moved across the flatbed 114. The multiple images can then be evaluated by a computing system (e.g., the edge computing device 102 and/or a remote computing system) to determine or otherwise identify characteristics of the product. Image analysis techniques can also be performed to identify the product from these multiple images. For example, the image data captured by the flatbed camera 202 can also be used by the edge computing device 102 to determine whether a customer is engaging in ticket swapping.

Figure 3A:
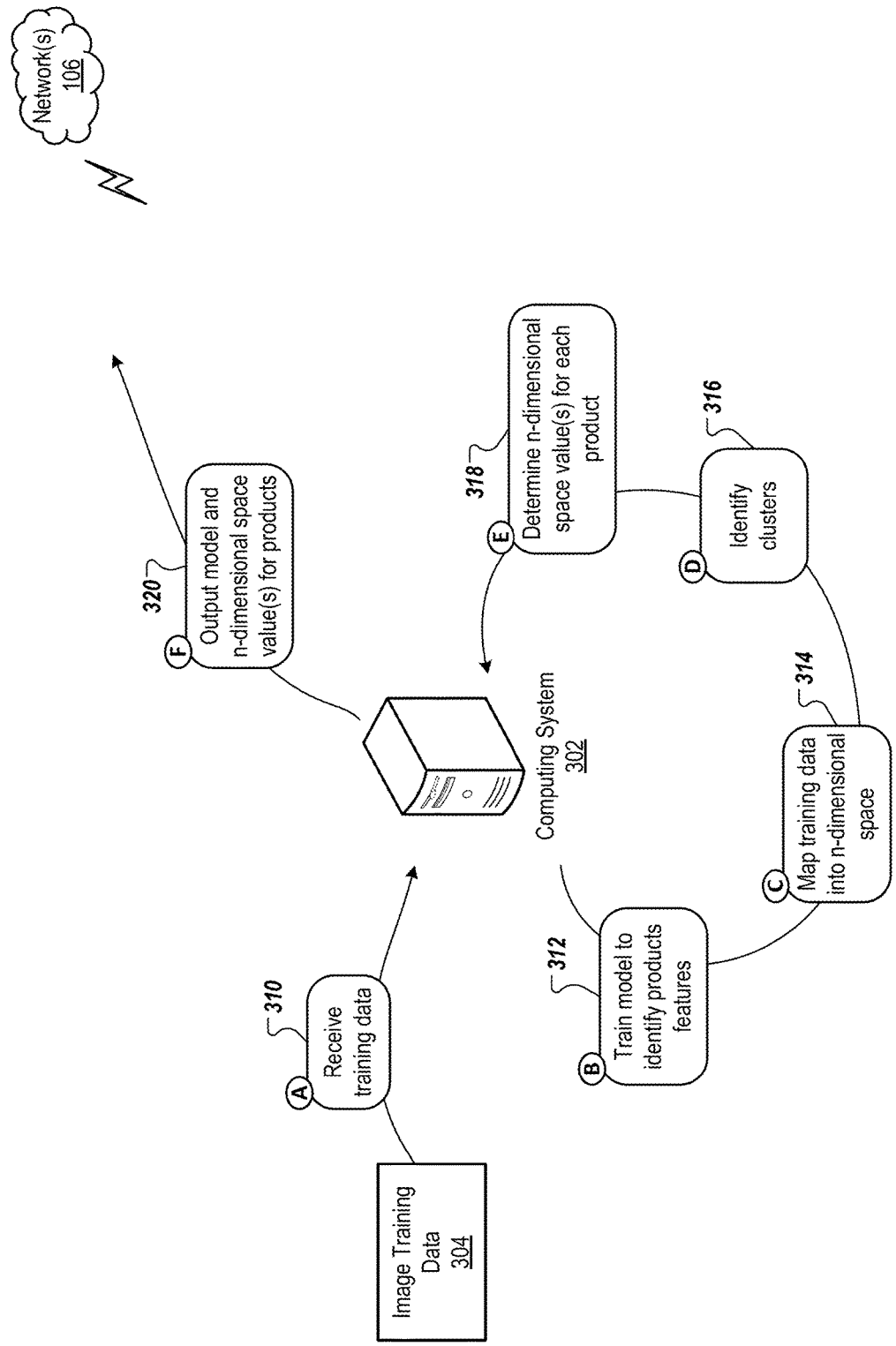
FIG. 3A is a conceptual diagram for training a machine learning product classification model using n-dimensional space feature values.

FIG. 3A is a conceptual diagram for training a machine learning product classification model using n-dimensional space feature values. A computing system 302 can be configured to train the model. The computing system 302 can be a remote computing system, server, network of computers or servers, and/or cloud computing system. The computing system 302 can be a centralized computing system in communication (e.g., via network(s) 106) with a plurality of edge computing devices and POS terminals at different checkout lanes across a network of stores. For example, the computing system 302 can be one of the edge computing devices at one of the checkout lanes across the network of stores. Training can be performed at the computing system 302. Models that are trained by the computing system, such as the product classification model, can then be transmitted to the edge computing devices at different checkout lanes across the network of stores. Execution of the model can be performed on the edge, at the edge computing devices, which can utilize less computational resources and avoid clogging network bandwidth.

As shown in FIG. 3A, the computing system 302 can receive image training data 304 (step A, 310). The image training data can include image data of every product that has been scanned at checkout lanes across the network of stores. The image training data can therefore include image data of every verified product scan, for example, where an imaged product is verified to match a scanned barcode. The image data can therefore be labeled or otherwise annotated with the verified product information, such as the barcode and/or SKU.

The image training data can include image data that is captured by similar devices. The computing system 302 can therefore train the product classification model using consistent and uniform image data. For example, the computing system 302 can receive all images of scanned products that were captured by the overhead camera 110 (e.g., refer to FIGS. 1-2) at different checkout lanes in the network of stores. These images can all have uniform and consistent field of view and lighting, thereby making training easier and more accurate. The computing system 302 can also receive images of scanned products that were captured by the flatbed camera 202 (e.g., refer to FIG. 2) at different checkout lanes in the network of stores. Using images having consistent angle, FOV, and lighting from the flatbed cameras 202, the computing system 302 can train the product classification model. Moreover, the image training data can include images of verified products.

The image training data can additionally and/or alternatively be captured by a camera that is attached to a handheld scanning device. For example, the image training data can include images captured by depth sensing cameras and/or thermal cameras. Images captured by the depth sensing cameras can be advantageous to determine placement and positioning of products relative to features in an ambient environment, including components of the checkout lane (e.g., the flatbed 114, the one or more scanning devices 116, etc.) and parts of a customer's body (e.g., hands, arms, etc.). For example, the depth sensing cameras can include LiDAR technology. The depth sensing cameras can be configure to emit infrared light and to generate a depth map depicting depth of field and relativity of product positioning and placement. The thermal cameras can capture images that can be used to generate heat maps. Using such heat maps, the computing system 302 can train the model to detect differences between customer hands (which are warmer than products) and products (which are colder than human body parts).

The computing system 302 can train the product classification model using a combination of images from the overhead camera 110, the flatbed camera 202, a thermal imaging camera, and a depth sensing camera at one checkout lane in one store. The trained model can then be deployed at every checkout lane across the network of stores. For example, the computing system 302 can train the model using image data from only one type of device (e.g., the overhead camera 110). The computing system 302 can optionally verify or otherwise improve the model using image data received from other types of devices (e.g., the flatbed camera 202, thermal imaging camera, and/or depth sensing camera).

Still referring to FIG. 3A, once the computing system 302 receives the image training data 304 in step A (310), the computing system 302 can train the product classification model to identify product features in the image data (step B, 312). For example, the computing system 302 can apply one or more machine learning models to the image training data to train the product classification model to identify a product and differentiate the product from a surrounding ambient environment. The computing system 302 can also apply machine learning models to the image training data to train the product classification model to identify product features. The product features can include different types of corners (e.g., round corners, sharp corners, etc.), different types of edges (e.g., round edges, smooth edges, sharp edges, etc.), different font types, colors, light reflectivity, product labels, and/or shape. As mentioned above, since the image training data can include image data captured by similar devices having consistent and uniform FOVs and lighting (e.g., the overhead camera 110), product features can be more easily and accurately identified. The computing system 302 can identify product features that are specific to one or more particular products. The computing system 302 can identify product features that are generic to a grouping or classification of products. For example, the computing system 302 can identify a unique label of a candy bar as a product feature. The computing system 302 can also identify an oblong yellow shape of both a zucchini and a banana.

The computing system 302 can map the image training data 304 into n-dimensional space (step C, 314). A number of dimensions in space can depend on a number of features that are identified. For example, if 3 features are identified, then the image training data 304 can be mapped into 3-dimensional (3D) space, where each dimension represents a different feature. One or more products can have the same identified features, regardless of whether they are the same product. In the example above, the zucchini and the banana can have the same features as oblong shape and yellow coloring. When mapping the zucchini and the banana into n-dimensional space, they can be closer to each other than the candy bar, which can have a rectangular shape and a bright red wrapper with bold white font. Mapping the image training data into n-dimensional space can therefore indicate that the zucchini and the banana are more similar to each other than either is to the candy bar.

The computing system 302 can then identify clusters in n-dimensional space (step D, 316). In other words, the computing system 302 can identify where points or values associated with product features in each of the image training data fall in n-dimensional space. Where there is an abundance of points or values, a cluster, it is more likely that the product appearing in the image training data has the feature(s) identified in that region of n-dimensional space.

In the example of the candy bar, banana, and zucchini, mapping any images of the candy bar into n-dimensional space can result in a grouping of points or values in the dimensions associated with features such as rectangle shape and bright red coloring/wrapping. These points or values can be identified as a cluster associated with the candy bar.

Mapping any images of the banana and zucchini in n-dimensional space can result in groupings of points or values closer to the dimensions associated with oblong shape and yellow coloring. For example, the bananas can also be mapped into dimensions associated with features such as angle of curvature, stem, and green coloring. The more image training data of bananas that falls into these other dimensions, the more likely a cluster of points or values will form in these dimensions to identify the banana, thereby differentiating the banana from a cluster of points or values around the oblong shape and yellow coloring dimensions that represent the zucchini.

Once the clusters are identified, the computing system 302 can determine n-dimensional space values for each product of the image training data 304 (step E, 318). The n-dimensional space values can be vector values, bounding boxes, planes, or some other value that can define an area or volume in n-dimensional space. The n-dimensional space values can also be standard deviations and/or other statistical analysis of points or values that have been mapped in the n-dimensional space. For example, the n-dimensional space values can also be ranges of values. As an example, in a cluster, the computing system 302 can identify vector values of a centroid. The computing system 302 can then determine a distance between each nearest neighbor vector values and the centroid's vector values. By averaging the distances, the computing system 302 can determine average vector values for the cluster.

In the example of the candy bar, banana, and zucchini, the computing system 302 can identify vector values for the cluster associated with the candy bar, the cluster associated with the banana, and the cluster associated with the zucchini. Each product can therefore be identified by different vector values.

The computing system 302 can quantify accuracy of the product classification model based on any of a variety of techniques, such as comparing distances between each point in a cluster to an average point for that cluster. The smaller the distances (and/or an average of all the distances), then the more likely the model can accurately identify the product associated with the cluster.

Finally, the computing system 302 can output the product classification model and n-dimensional space values for each of the products (step F, 320). For example, the computing system 302 can transmit the model and values to each edge computing device 102 in all checkout lanes in a network of stores. Each of the edge computing devices 102 can then execute the product classification model or other models (e.g., product shape model, product size model) on the edge and in real-time in order to identify products that are scanned during checkout (e.g., refer to FIGS. 4A-C).

Figure 3B:
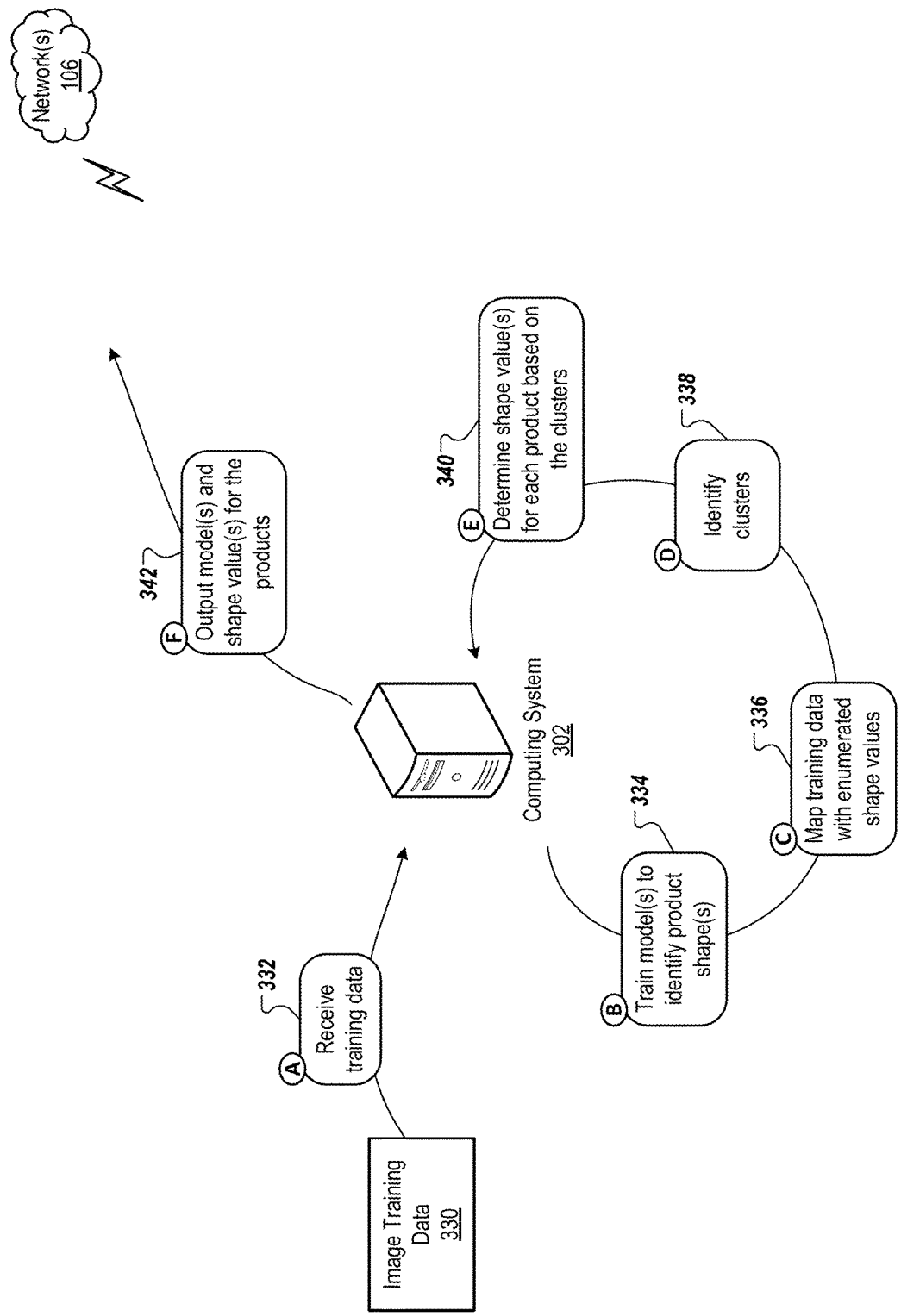
FIG. 3B is a conceptual diagram for training a machine learning product shape model.

FIG. 3B is a conceptual diagram for training a machine learning product shape model. The computing system 302 can receive image training data 330 (step A, 332). The image training data 330 can be similar to the image training data 304 described in FIG. 3A. In some implementations, the image training data 330 can include images of products that have been annotated and/or labeled. The images can be annotated and/or labeled with expected shapes for the products. The images training data 330 can include images of products in which their respective shapes have been validated. The images training data 330 can include images of products from various different angles. Expected shapes of the products from the various different angles can be annotated and labeled in the images training data 330.

The computing system 302 can train one or more models to identify product shapes in the image training data 330 (step B, 334). The computing system 302 can, in some implementations, train a model for each type of product that can be identified from images. The model can then be trained to identify a shape of the product regardless of an angle at which the product appears in image data. Therefore, the model can be trained to identify the shape of the product at various different angles. The computing system 302 can, in some implementations, train models for identifying particular types of product shapes (e.g., a model can be trained to identify rectangular-shaped products, another model can be trained to identify spherical-shaped products, etc.).

The model can be trained to map the product in the image training data 330 to expected, enumerated shapes for that product (step C, 336). In some implementations, the model can be trained using polygon descriptions and/or references as the enumerated shape values. For example, the model can be trained to compare a shape of the product in the image data to expected polygons for the product, such as rectangles, squares, spheres, long rectangles, narrow rectangles, rhombuses, etc. The model can be trained, in some implementations, to analyze patches of the product appearing in the image data and compare the patches to known or expected polygons or other defined shapes for the product. In some implementations, the model can map the training data in 1D space, where each enumerated shape or polygon is represented in 1D space. The model can also map the training data into 2D space in which one dimension represents the enumerated shape values and another dimension represents a confidence value that the imaged product has the respective enumerated shape value(s).

The model can also be trained to output a value indicating an identified shape or shapes of the product. The model can be trained to output a binary or float value indicating a confidence or likelihood that the product has one or more particular or expected shapes. The model can be trained to output a histogram or enumerated values indicating an identified or likely shape of the product. The enumerated values can include but are not limited to rectangle, square, sphere, blob, or other string values representing one or more polygons or other defined shapes.

As part of training, the computing system 302 can identify clusters of shape values for a product in step D (338). Each product can have various shape values. The shape values can vary depending on an angle at which the product is imaged or appears in the image training data 330. Therefore, in some implementations, each cluster can correspond to the product imaged at a different angle or from a different side (e.g., a front view, back view, top down view, bottom up view, left side view, right side view, diagonal downward view, diagonal upward view, etc.). For example, a first cluster of shape values can correspond to the product, such as a cereal box, being imaged from a side view (e.g., the shape values can be long, thin rectangles). A second cluster of shape values can correspond to the cereal box being imaged from a front of back view (e.g., the shape values can be wide and tall rectangles). One or more other, additional, or fewer clusters can also be generated and identified for the product's identified shape values.

The computing system 302 can determine the shape value(s) for each product in the image training data 330 based on the identified clusters (step E, 340). Refer to discussion of step E (318) in FIG. 3A for further discussion about the determining the values for each product.

In step F (342), the computing system 302 can output the trained model(s) and the determined shape value(s) for the products. Refer to step F (320) in FIG. 3A for additional discussion about outputting the trained model(s) and product shape values.

Figure 3C:
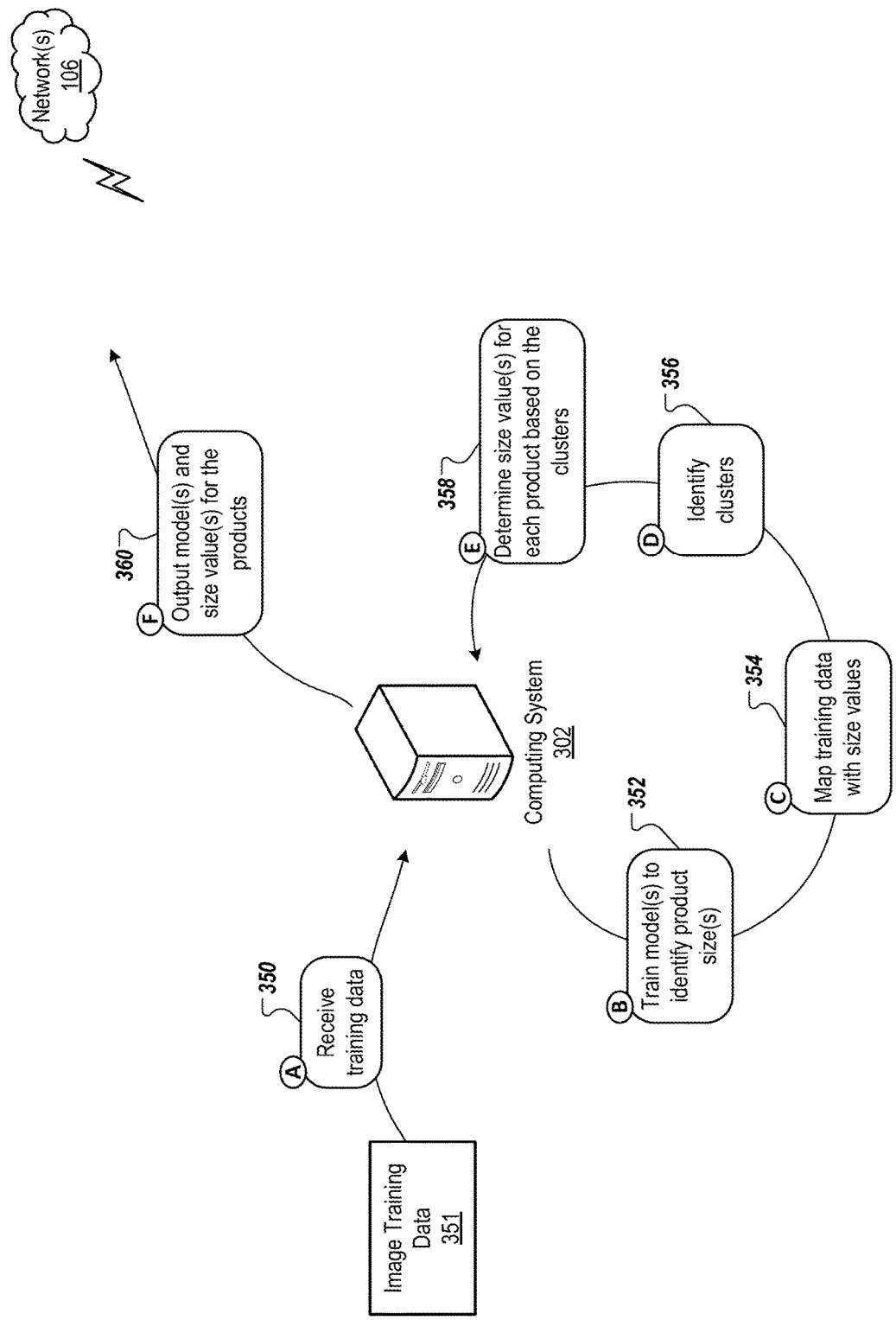
FIG. 3C is a conceptual diagram for training a machine learning product size model.

FIG. 3C is a conceptual diagram for training a machine learning product size model. The computing system 302 can receive image training data 351 in step A (350). The image training data 351 can be similar to the image training data 304 and/or the image training data 330 described in FIGS. 3A-B. The image training data 351 can include images of products that have been annotated and/or labeled. The images can be annotated and/or labeled with expected measurements for packaging of the products and/or measurements of the products themselves (e.g., without packaging). The image training data 351 can also include images of the products from various angles and/or viewpoints. Sizing of the products can be annotated and/or labeled at the various angles and/or viewpoints. In some implementations, the image training data 351 can also be annotated and/or labeled with expected or known volumes, surface areas, xy values, and/or xyz values for the products appearing in the images.

In step B (352), one or more models can be trained to identify product sizes from the image data. As described in reference to FIG. 3B, the computing system 302 can train one or more models to identify size of different products. For example, a model can be trained to identify sizing of a particular type of product and another model can be trained to identify sizing of another type of product. The models can be trained to identify product sizing from a 2D view of the product. The models can be trained to compare aspects of the product relative to other features appearing in the image data, such as a flatbed or other scanning area, to then determine a size of the product. The models can also be trained to determine the size of the product based on identifying and/or summing a quantity of pixels in the image data that are occupied by the product. The models can be trained to generate output indicating the quantity of pixels occupied by the product in the image data. The models can also be trained to generate output indicating a volume or surface area of the product in the image data. The models can be trained to generate output indicating xy coordinates and/or xy values of the product in the image data. The models can also be trained to generate output indicating xyz coordinates and/or xyz values of the product in the image data. In some implementations, the models can be trained to output numeric or integer values indicating a size of the product in the image data. The models can also be trained to output confidence values indicating a likelihood that the product is of a certain size and/or within a threshold size range.

As part of training, the computing system 302 can map the training data with size values in step C (354). For example, the computing system 302 can correlate or bucketize the identified product sizes from step B (352) into enumerated product sizes (e.g., known or expected sizes for different products). The identified product sizes can be mapped to big products, small products, and other product size classifications. The computing system 302 can also map the training data with surface area values, volumes, xy space, and/or xyz space for the products, as described herein.

As described in reference to step D (338) in FIG. 3B, the computing system 302 can also identify clusters of the mapped values for each product. A product can have one or more clusters of expected size values. Each cluster can correspond to a different angle at which the product may be imaged. Each cluster can also correspond to a different side or portion of the product that is imaged or visible.

Based on the clusters, the computing system 302 can determine size value(s) for each product in step E (358). Refer to step E (340) in FIG. 3B for additional discussion about determining the size values for each product.

The computing system 302 can then output the trained model(s) and the determined size value(s) for the products in step F (360). Refer to step F (320) in FIG. 3A and step F (342) in FIG. 3B for further discussion about outputting the trained model(s) and product size values.

Figure 4A:
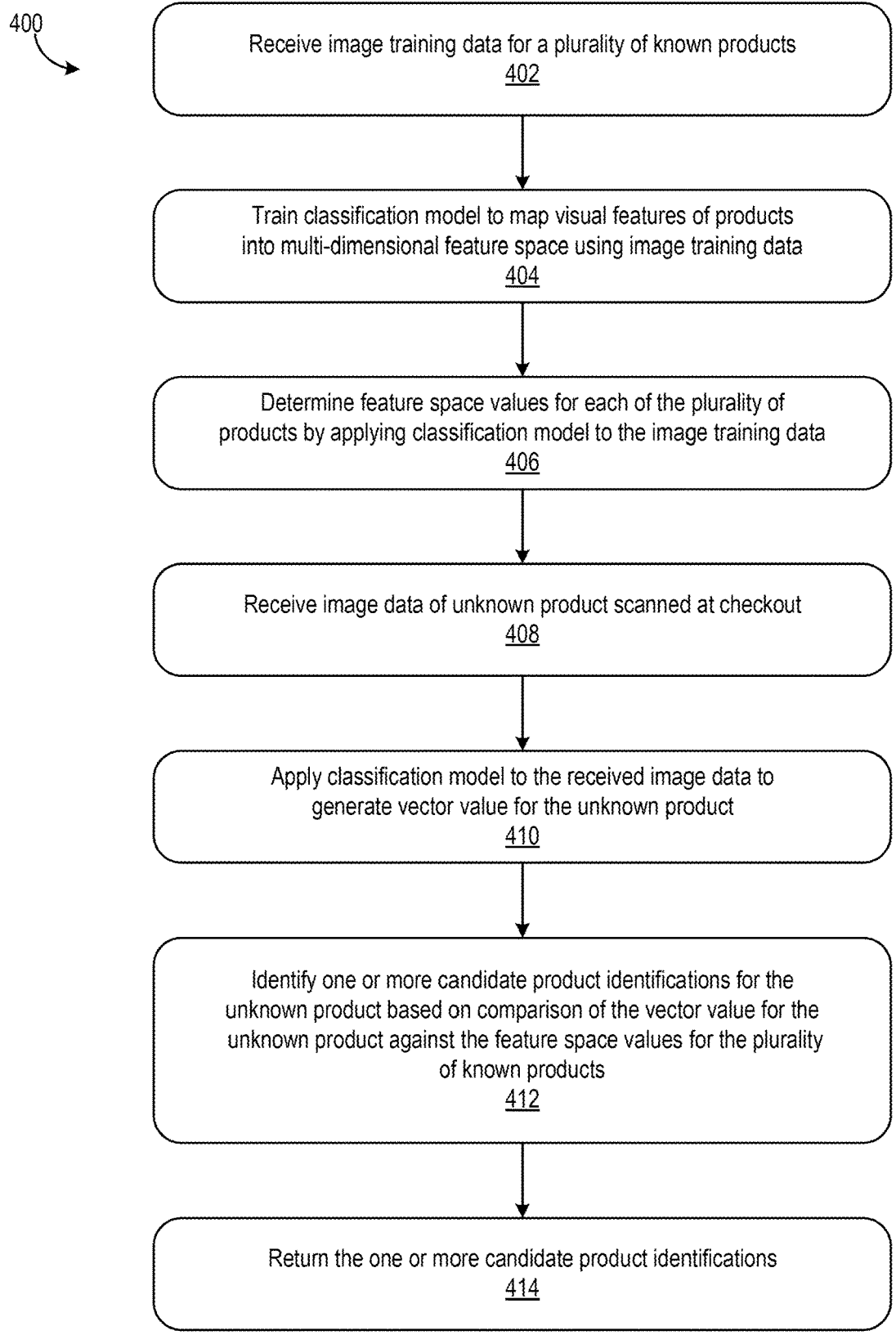
FIG. 4A is a flowchart of a process for identifying a product using a machine learning product classification model with n-dimensional space feature values.

FIG. 4A is a flowchart of a process 400 for identifying a product using a machine learning product classification model with n-dimensional space feature values. One or more blocks in the process 400 can be performed by the computing system 302, such as blocks 402-406. One or more blocks in the process 400 can be performed by the edge computing device 102 in each checkout lane 100 across a network of stores, such as blocks 408-414. For example, the process 400 can be performed at one device, such as the computing system 302 and/or the edge computing device 102. One or more blocks in the process 400 can also be performed by one or more other computing systems, servers, devices, and/or network of computers. For illustrative purposes, the process 400 is described from a perspective of a computing system, which can include the computing system 302 and/or the edge computing device 102.

Referring to the process 400, the computing system can receive image training data for a plurality of known products (402). Refer to step A (310) in FIG. 3A. The image training data can already be annotated and/or labeled. The image training data can also be classified based on product type and/or category of products. For example, one or more product features can be identified, labeled, annotated, and/or classified by the computing system in 402. Refer to step B (312) in FIG. 3A.

The computing system can train a product classification model to map visual features of the products into multi-dimensional feature space using the image training data (404). Refer to step C (314) in FIG. 3A.

In 406, the computing system can determine feature space values for each of the plurality of products by applying the classification model to the image training data. For example, the computing system can map the image training data into n-dimensional space, identify clusters, and determine n-dimensional space value(s) for each product in the image training data. The computing system can also output the classification model and n-dimensional space value(s) for the products. As described herein, the outputted model and value(s) can then be used by each edge computing device 102 in a network of stores. Refer to steps D-F (316-320) in FIG. 3A.

During run-time, the computing system can receive image data of one or more unknown products that are scanned during checkout (408). As described herein, images can be captured of products as a customer scans the products at a checkout lane (e.g., refer to FIG. 1). The images can be captured by an overhead camera at each checkout lane (e.g., the camera 110 at the checkout lane 100 in FIG. 1). One or more images can also be captured by a flatbed camera at a checkout lane (e.g., refer to the flatbed camera 202 in the checkout lane 100 in FIG. 2). The images can be still images and/or video. For example, image data can be captured of each product as it passes over a flatbed scanning area of the checkout lane. In another example, the image data can include a plurality of products within a field of view of the camera.

The computing system can apply the machine learning classification model to the received image data to generate vector values for the unknown products in 410. The classification model can be trained to identify features of the unknown product in the image data and map those features into n-dimensional space. Mapping the features of the unknown product into n-dimensional space can return a vector, multiple vector values, a bounding box, and/or one or more other values that can be used to define an area or volume of n-dimensional space for that unknown product. The returned value(s) of the unknown product can then be used to determine how similar the value(s) are to values of one or more known products.

In 412, the computing system can identify one or more candidate product identifications for the unknown products. For example, the identification can be based on a comparison of the vector value for the unknown product against the feature space values for the plurality of known products. As an example, the computing system can compare vector values, labels, centroids, and/or bounding boxes of the unknown product to one or more known products. Greater similarity in any of the vector values, labels, centroids, and/or bounding boxes can indicate that the unknown product is likely the known product it is being compared to. The less similarly, the more likely the unknown product is not the known product it is being compared to.

The computing system can, for example, perform a trigonometric or statistical analysis on a value representing a feature of the unknown product and compare that to an expected or projected value for the actual or known product. Comparison of values can include determining a distance between the value of the unknown product and the value of the actual product. Vector values of the unknown product can be floating values that indicate a confidence level that the unknown product is the actual product. For example, a smaller distance between vector values of the unknown product and expected values for the actual product can result in a higher confidence that the unknown product is the actual product.

As another example, the computing system can define a bounding box for the actual product using the product classification model. If points or other values of the unknown product fall within the bounding box, then the computing system can identify the actual product as a candidate product identification. The computing system can also identify the actual product as a candidate product identification if the points or other values of the unknown product fall within a threshold distance from the bounding box of the actual product. One or more other trigonometric or statistical analyses can be performed in order to identify the candidate product identifications using the product classification model.

In 414, the computing system can return the one or more candidate product identifications. The computing system can output a list having the most likely products that the unknown product may be. For example, the computing system can output a list with top 5 candidate product identifications. The output can include any other threshold number of candidate product identifications. For example, the output can include the most likely candidate product identification. In another example, where the unknown product has a highest confidence value that can be assigned (e.g., 100), the candidate product identification associated with that confidence value can be returned instead of a list of one or more candidate product identifications.

The returned candidate product identifications can be transmitted to and/or outputted at the edge computing device, a POS terminal, and/or a computing system or server for a particular store or network of stores. For example, the candidate product identifications can be outputted at a display screen of the edge computing device. A customer who is checking out can view the candidate product identifications and make a selection of the actual product that they are purchasing. The customer's bill can then be updated with a correct price for that product, rather than a price that may be associated with a barcode that the customer scanned. This can be used to prevent or otherwise mitigate ticket switching.

As another illustrative example, when a single candidate product identification is returned, the identification can be transmitted to the POS terminal such that the POS terminal can automatically update the customer's bill to reflect the actual price of the product being purchased.

As yet another example, the candidate product identifications can be outputted to a remote computing system that is used by in-store employees. The in-store employees can monitor activity in the store that can be related to safety and security. The employees can, for example, determine whether the customer is attempting to purchase the product using a mismatched label or barcode. Thus, the employees can determine whether the customer is engaging in ticket swapping and whether it's a situation where they can or should intervene. For example, the employees can also receive the candidate product identifications in order to track product shortages in the store.

As yet another example, the candidate product identifications can be returned by the computing system and used by the computing system to improve the product classification model. As described herein, the higher the confidence values, the more likely the product classification model is accurately identifying the associated product. On the other hand, the lower the confidence values, the less likely the model is accurately identifying the associated product. The computing system can therefore use the returned candidate product identifications, the image data of the unknown products, and/or the vector values of the unknown products in order to continuously train and improve the product classification model.

Figure 4B:
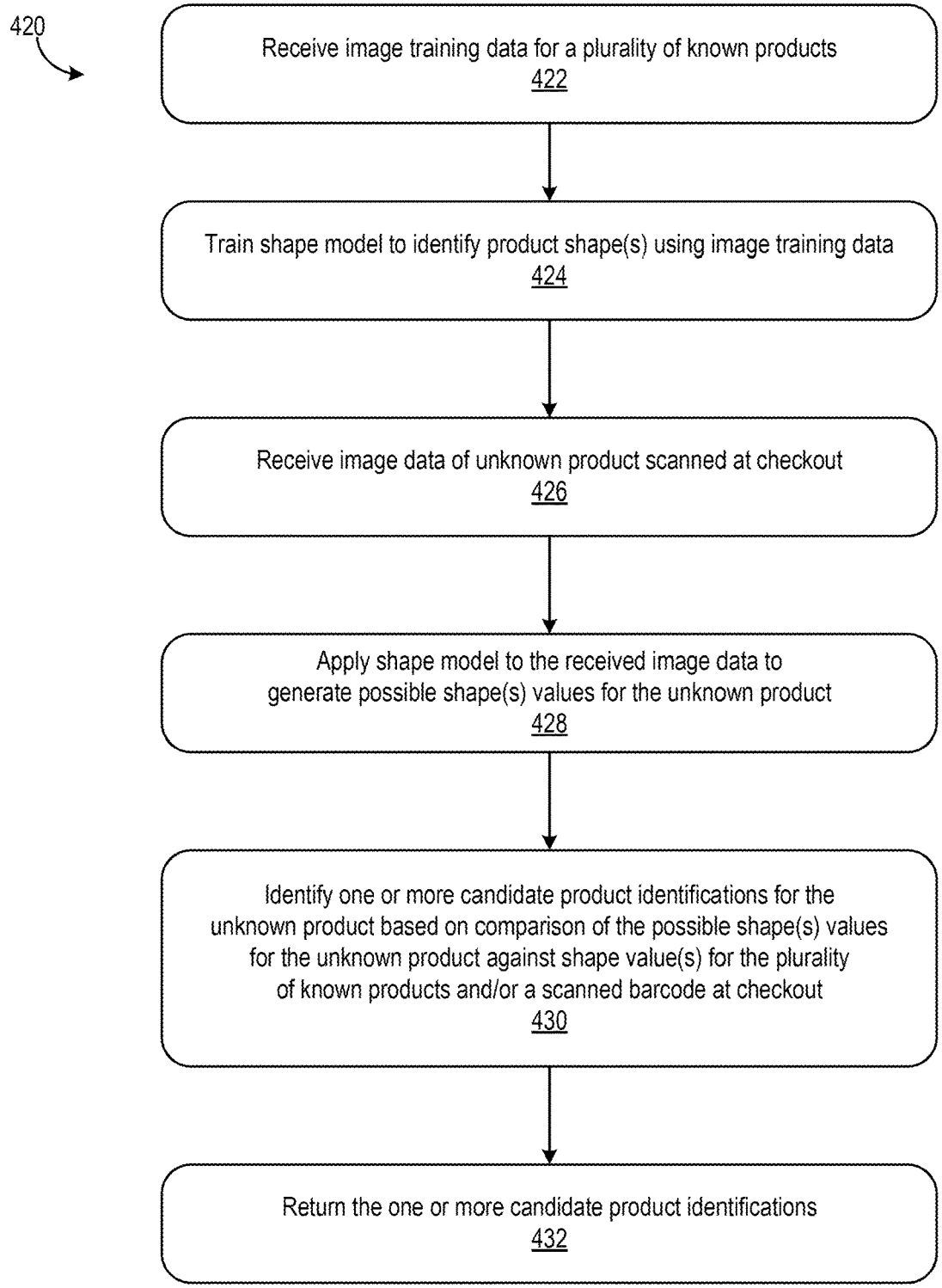
FIG. 4B is a flowchart of a process for identifying a product using a machine learning product shape model.

FIG. 4B is a flowchart of a process 420 for identifying a product using a machine learning product shape model. One or more blocks in the process 420 can be performed by the computing system 302, as described in reference to the process 400 in FIG. 4A. One or more blocks in the process 420 can be performed by the edge computing device 102 in each checkout lane 100 across a network of stores, as described in reference to the process 400 in FIG. 4A. For example, blocks 422-424 can be performed by the computing system 302 at a first time and blocks 426-432 can be performed by the edge computing device 102 at a second time. The second time can be later than the first time. One or more blocks in the process 420 can also be performed by one or more other computing systems, servers, devices, and/or network of computers. For illustrative purposes, the process 420 is described from a perspective of a computing system, which can include the computing system 302 and/or the edge computing device 102.

Referring to the process 420, the computing system can receive image training data for a plurality of known products in block 422. Refer to step A (332) in FIG. 3B.

In block 424, the computing system can train a shape model to identify one or more product shapes using the image training data. Refer to step B (334) in FIG. 3B.

The computing system can receive image data of an unknown product scanned at checkout in block 426. Block 426 can be performed at a later and/or different time than blocks 422-424. Refer to block 408 in the process 400 of FIG. 4A for additional discussion.

The computing system can apply the shape model to the received image data to generate possible shape values for the unknown product (block 428). As described in reference to FIG. 3B, the shape model can generate output indicating an enumerated value. The enumerated value can be any type of shape or polygon that can be identified for the imaged unknown product. For example, the possible shape values can include values such as rectangle, square, sphere, blob, or any other enumerated value. The possible shape values generated by the shape model can also include a confidence value indicating a likelihood that the product in the image data has a particular shape or expected shape. The possible shape values generated by the shape model can also include a histogram or other representation of a potential shape or shapes of the unknown product in the image data.

The computing system can also identify one or more candidate product identifications for the unknown product based on comparison of the possible shape(s) values for the unknown product against shape value(s) for the plurality of known products and/or a scanned barcode at checkout (block 430). For example, the computing system can compare the possible shape(s) values to expected shape(s) values for a product barcode that was scanned during the checkout. If the possible shape(s) values are within a threshold range of the expected shape(s) values and/or the possible shape(s) values match the expected shape(s) values, the computing system can generate an indication of a product match in block 430. If, on the other hand, the possible shape(s) values are not within the threshold range of the expected shape(s) values and/or the possible shape(s) values do not match the expected shape(s) values, the computing system can generate an indication of a product mismatch in block 430. In some implementations, the computing system can also identify which product the unknown product may be.

In block 432, the computing system can return the one or more candidate product identifications. As mentioned above, the computing system can return an indication that the unknown product likely matches the scanned barcode during checkout based on the possible shape(s) values of the unknown product. The computing system can also return an indication that the unknown product likely does not match the scanned barcode during checkout based on the possible shape(s) values of the unknown product.

In some implementations, the computing system can simply return the possible shape(s) values for the unknown product that were generated in block 428. In some implementations, the computing system can return a subset of the possible shape(s) values for the unknown product that satisfy threshold shape criteria. For example, the subset can include the possible shape(s) values that are within expected threshold shape(s) values for a known product or the scanned barcode from the checkout. As another example, the subset can include the possible shape(s) values that have confidence values exceeding some threshold confidence level.

Figure 4C:
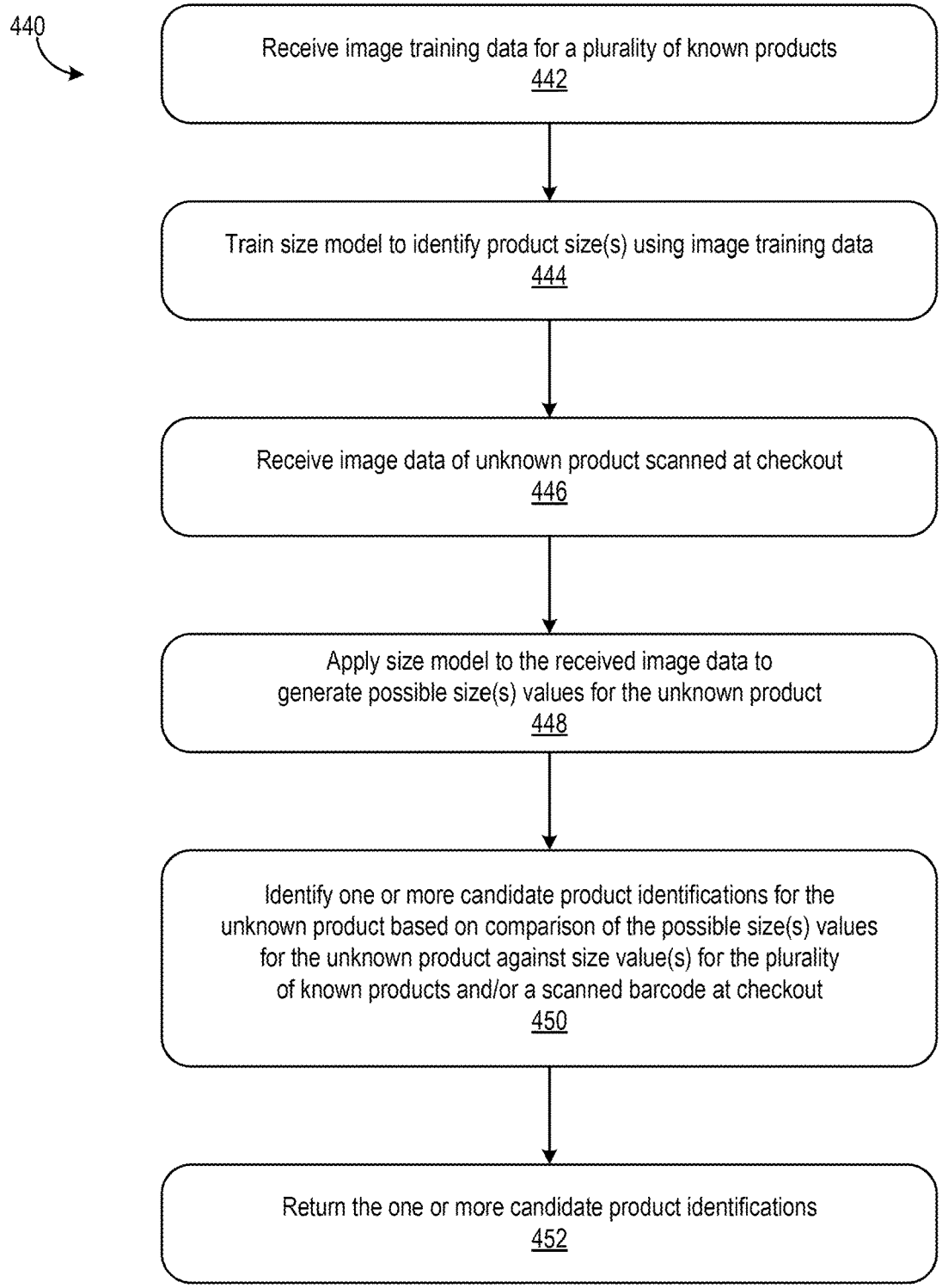
FIG. 4C is a flowchart of a process for identifying a product using a machine learning product size model.

FIG. 4C is a flowchart of a process 440 for identifying a product using a machine learning product size model. One or more blocks in the process 440 can be performed by the computing system 302, as described in reference to the process 400 in FIG. 4A and the process 420 in FIG. 4B. One or more blocks in the process 440 can be performed by the edge computing device 102 in each checkout lane 100 across a network of stores. For example, blocks 442-444 can be performed by the computing system 302 at a first time and blocks 446-452 can be performed by the edge computing device 102 at a second time. The second time can be later than the first time. One or more blocks in the process 440 can also be performed by one or more other computing systems, servers, devices, and/or network of computers. For illustrative purposes, the process 420 is described from a perspective of a computing system, which can include the computing system 302 and/or the edge computing device 102.

Referring to the process 440, the computing system can receive image training data for a plurality of known products in block 442. Refer to step A (342) in FIG. 3C.

In block 444, the computing system can train a size model to identify one or more product sizes (e.g., volume, surface area, dimensions, quantity of pixels, xy coordinates, xyz coordinates) using the image training data. Refer to step B (344) in FIG. 3C.

The computing system can receive image data of an unknown product scanned at checkout in block 446. Block 446 can be performed at a later and/or different time than blocks 442-444. Refer to block 408 in the process 400 of FIG. 4A for additional discussion.

The computing system can apply the size model to the received image data to generate possible size values for the unknown product (block 448). As described in reference to FIG. 3C, the size model can generate output indicating a size and/or likely size of the product appearing in the image data. The output can be a numeric or integer value, such as a surface area, volume, and/or quantity of pixels represented by the product in the image data. The possible size values generated by the size model can also include a confidence value indicating a likelihood that the product in the image data has a particular size or expected size.

The computing system can also identify one or more candidate product identifications for the unknown product based on comparison of the possible size(s) values for the unknown product against size value(s) for the plurality of known products and/or a scanned barcode at checkout (block 450). For example, the computing system can compare the possible size(s) values to expected size(s) values for a product barcode that was scanned during the checkout. If the possible size(s) values are within a threshold range of the expected size(s) values and/or the possible size(s) values match the expected size(s) values, the computing system can generate an indication of a product match in block 450. If, on the other hand, the possible size(s) values are not within the threshold range of the expected size(s) values and/or the possible size(s) values do not match the expected size(s) values, the computing system can generate an indication of a product mismatch in block 450. In some implementations, the computing system can also identify which product the unknown product may be.

In block 452, the computing system can return the one or more candidate product identifications. As mentioned above, the computing system can return an indication that the unknown product likely matches the scanned barcode during checkout based on the possible size(s) values of the unknown product. The computing system can also return an indication that the unknown product likely does not match the scanned barcode during checkout based on the possible size(s) values of the unknown product.

In some implementations, the computing system can simply return the possible size(s) values for the unknown product that were generated in block 448. In some implementations, the computing system can return a subset of the possible size(s) values for the unknown product that satisfy threshold size criteria. For example, the subset can include the possible size(s) values that are within expected threshold size(s) values for a known product or the scanned barcode from the checkout. As another example, the subset can include the possible size(s) values that have confidence values exceeding some threshold confidence level.

Referring to all the processes in FIGS. 4A-C, blocks 412-414 (refer to FIG. 4A), blocks 430-432 (refer to FIG. 4B), and blocks 450-452 (refer to FIG. 4C) for identifying candidate product identifications can be performed alone or in one or more combinations. For example, blocks 412-414 in FIG. 4A can be performed to identify candidate product identifications based on n-dimensional space feature values. The process 420 in FIG. 4B can then be performed based on and/or using just the candidate product identifications determined in the process 400 in FIG. 4A. Therefore, the process 420 can be performed as a way to filter the candidate product identifications that were made in the process 400 in FIG. 4A. The process 440 in FIG. 4C can then be performed based on and/or using the filtered candidate product identifications determined in the process 420 in FIG. 4B to generate a curated list of candidate product identifications or a particular one of the candidate product identifications that likely is the unknown product. The processes 400, 420, and 440 can be combined in any other combinations and/or orders in order to generate the curated list of candidate product identifications. For example, the process 420 can be performed to generate a first list of candidate product identifications. The process 400 can then be performed to filter the first list of candidate product identifications and the process 440 can be performed to generate the curated list of candidate product identifications from the filtered list of candidate product identifications. As another example, the process 440 can be performed to generate a first list of candidate product identifications. The process 420 can then be performed to filter the first list of candidate product identifications and the process 400 can be performed to generate the curated list of candidate product identifications from the filtered list of candidate product identifications. As another example, the process 440 can be performed to generate a first list of candidate product identifications and either of the processes 400 or 420 can then be performed to filter the first list of candidate product identifications to generate a curated list. One or more other combinations and/or orders of performing the processes in FIGS. 4A-C can be used to identify and return the candidate product identifications described herein.

In some implementations, the processes in FIGS. 4A-C can be performed independently of each other. The computing system can then identify a set of candidate product identifications that are identified in all of the processes 400, 420, and 440. Alternatively, the computing system can identify a set of candidate product identifications that are identified in a subset of all of the processes 400, 420, and 440 (e.g., 400 and 420, 400 and 440, 420 and 440). The computing system can return the set of candidate product identifications instead of each list of candidate product identifications that is determined in each of the processes 400, 420, and 440. The candidate product identifications from all of the processes 400, 420, and 440, or a subset of all of the processes 400, 420, and 440, can also be combined using one or more logical operations in order to generate a final or curated list of candidate product identifications.

Figure 5:
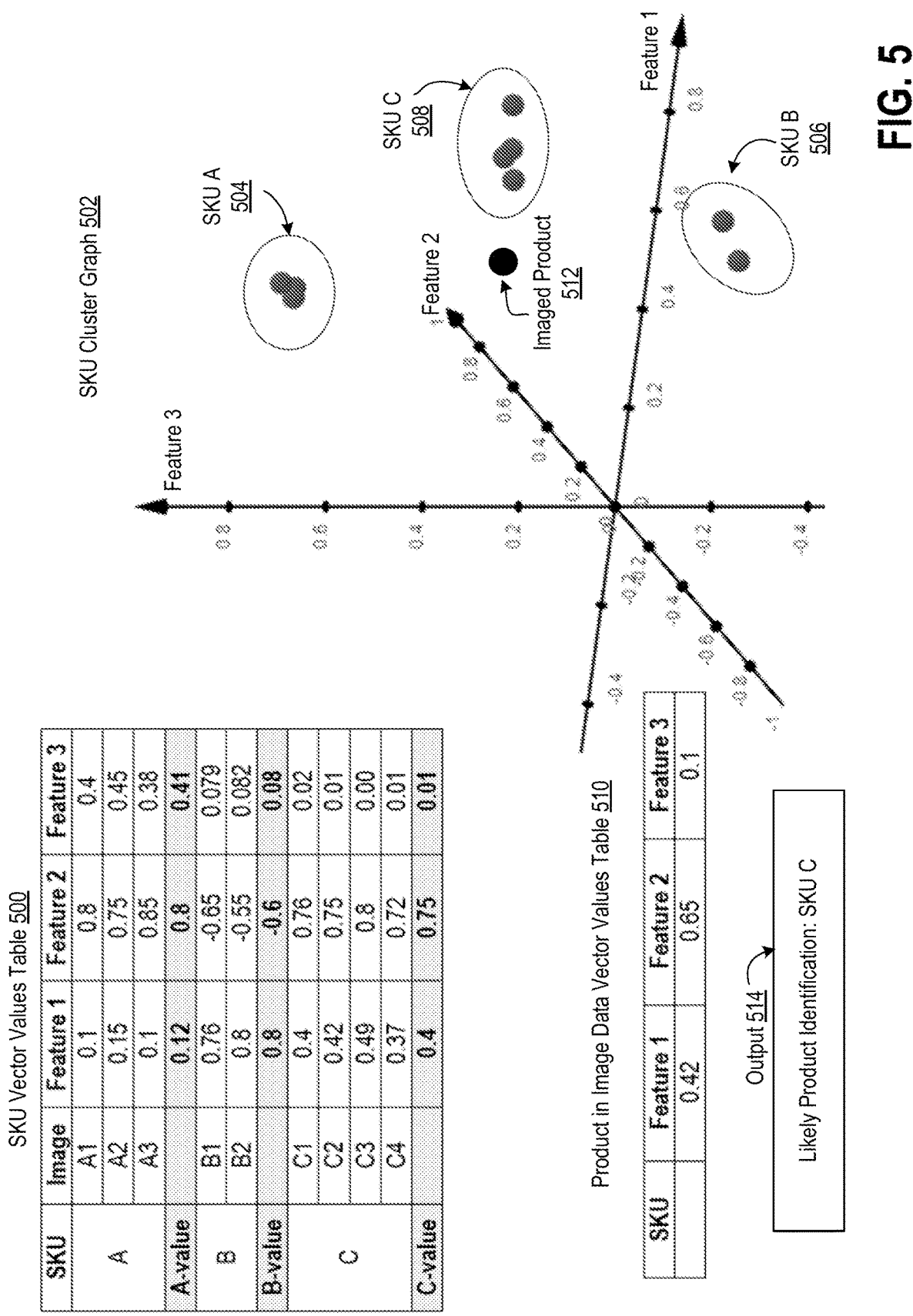
FIG. 5 is a graphical depiction of products mapped in n-dimensional space using the machine learning product classification model.

FIG. 5 is a graphical depiction of products mapped in n-dimensional space using the machine learning product classification model. As mentioned throughout, when training the product classification model, a vector values table 500 can be outputted (e.g., refer to FIG. 3A). The table 500 includes values for each known product in image training data that is mapped into n-dimensional space. As an illustrative example, the table 500 identifies products based on SKU. Each product can have a different SKU. In the table 500, 3 known products are mapped into n-dimensional space. One product is identified by SKU A, a second product is identified by SKU B, and a third product is identified by SKU C. Each of the SKUs A, B, and C can also be represented in one or more images (e.g., image training data). For example, SKU A is represented in 3 images: A1, A2, and A3. SKU B is represented in 2 images: B1 and B2. SKU C is represented in 4 images: C1, C2, C3, and C4.

As described herein, a computing system, such as the computing system 302, can identify product features in each of the images A1, A2, A3, B1, B2, C1, C2, C3, and C4. Sometimes, the features can already be annotated and/or labeled in the images. The images A1, A2, A3, B1, B2, C1, C2, C3, and C4 can then be mapped into n-dimensional space, where each dimension of space indicates a different feature. In the example table 500 in FIG. 5, 3 features have been identified. The images A1, A2, A3, B1, B2, C1, C2, C3, and C4 are therefore mapped into 3-dimensional space, as shown in SKU cluster graph 502.

Numeric values can then be assigned, by the computing system, for each feature that appears in the images A1, A2, A3, B1, B2, C1, C2, C3, and C4. In the table 500, numeric values are assigned from −1 to 1. One or more other ranges of values can be used by the computing system. The numeric values can indicate how much of a feature the product in the image likely has. For example, a value less than 1 can indicate that the product likely does not have that feature. A value equal to or closer to 1 can indicate that the feature is very prevalent in the product. When multiple images are associated with a particular product of SKU, the numeric values for each of those images can be averaged to find values for the SKU. One or more other trigonometric and/or statistical analyses can be performed in order to find the aggregate value(s) for the SKU.

In the table 500, the product identified in image A1 is assigned values {0.1, 0.8, 0.4}, representing feature 1, feature 2, and feature 3, respectively. The product in image A2 (which is identified by the same SKU A as the product in image A1) is assigned values {0.15, 0.75, 0.45}. the product in image A3 is assigned values {0.1, 0.85, 0.38}. Based on these values, feature 2 is most prevalent and feature 1 is least prevalent in products that are identified by SKU A.

The product identified in image B1 is assigned values {0.76, −0.65, 0.079}. The product identified in image B2 is assigned values {0.8, −0.55, 0.082}. Based on these values, feature 1 is most prevalent and feature 2 is least prevalent in products that are identified by SKU B.

With regards to SKU C, the product identified in image C1 is assigned values {0.4, 0.76, 0.02}. The product identified in image C2 is assigned values {0.42, 0.75, 0.01}. The product identified in image C3 is assigned values {0.49, 0.8, 0.00}. The product identified in image C4 is assigned values {0.37, 0.72, 0.01}. Based on these values, feature 2 is most prevalent and feature 3 is least prevalent in products that are identified by SKU C.

As mentioned, each of the assigned values for the images A1, A2, A3, B1, B2, C1, C2, C3, and C4 can be mapped into 3D space, as shown in the SKU cluster graph 502. Feature 1 can be on the x axis, feature 2 can be the z axis, and feature 3 can be the y axis. The features can be mapped onto any other axes, as desired by a user and/or determined by the computing system. When the values are graphed, they can begin clustering in certain regions of 3D space. Shorter distances between graphed values can indicate that such features are more likely associated with a particular SKU.

In the graph 502, assigned values for A1, A2, and A3 are all relatively close together (e.g., having short distances between each assigned value), thereby forming SKU A cluster 504. As mentioned above, feature 2 is most prevalent but so is feature 3 in products associated with the SKU A. This is demonstrated by the position of the cluster 504 relative to the z axis (which represents feature 2) and the y axis (which represents feature 3).

Assigned values for B1 and B2 are also relatively close together, thereby forming SKU B cluster 506. As mentioned, feature 1 is most prevalent, which is demonstrated by the position of the cluster 506 relative to the x axis (which represents feature 1).

Assigned values for C1, C2, C3, and C4 are also relatively close together, thereby forming SKU C cluster 508. As mentioned, feature 2 is most prevalent, but so is feature 1, which is demonstrated by the position of the cluster 508 closer relative to the z axis and the x axis.

Moreover, for each of the SKUs, the assigned values are relatively close to each other (+−0.05), which can indicate that the product classification model is likely accurate in identifying products based on features.

Now that clusters 504, 506, and 508 have been identified for each of the SKUs A, B, and C, respectively, the computing system can determine aggregate feature values for each of the SKUs. The computing system can average the values identified in each of the clusters 504, 506, and 508 in order to determine the aggregate feature values. The computing system can also define a bounding box around each of the clusters 504, 506, and 508. The computing system can also identify a centroid point for each of the clusters 504, 506, and 508 and use that centroid point for the aggregate feature values for each SKU. One or more other trigonometric and/or statistical analyses can be used to determine aggregate feature values for the SKUs in n-dimensional space.

In the example of FIG. 5, the assigned values for each of the SKUs are averaged to determine the aggregate feature values. By averaging the assigned values for SKU A, the resulting aggregate feature values are 0.12 for feature 1, 0.8 for feature 2, and 0.41 for feature 3. SKU B's aggregate feature values are 0.8 for feature 1, −0.6 for feature 2, and 0.08 for feature 3. SKU C's aggregate feature values are 0.4 for feature 1, 0.75 for feature 2, and 0.01 for feature 3. The aggregate feature values can be outputted by the computing system with the trained product classification model (e.g., refer to FIG. 3A). Thus, during run-time use, the aggregate feature values can be compared to values that are assigned to unknown imaged products to determine which features are most prevalent in the unknown imaged products. By determining which features are most prevalent in the unknown imaged products, the computing system can identify a candidate product identification and/or one or more candidate product identifications.

Still referring to FIG. 5, during run-time use, a product is captured in image data and inputted to the product classification model (e.g., refer to FIG. 4A). Output from the model includes product in image data vector values table 510. The table 510 indicates that no SKU has been identified for the product in the image data. Thus, the product is unknown. However, using the product classification model, values were assigned to the product for features 1, 2, and 3. Feature 1 has a value 0.42, feature 2 has a value 0.65, and feature 3 has a value 0.1. Alone, these values may not signify much about the unknown product. However, in comparison to the aggregate feature values that were identified for products associated with SKUs A, B, and C, the feature values of the unknown product in the image data can be used to identify that product.

Accordingly, to compare the feature values of the unknown product in the image data to the aggregate feature values for the SKUs A, B, and C, the feature values of the unknown product can be mapped in 3D space. In the SKU cluster graph 502, imaged product 512 is mapped between the x and z axes, closest to the z axis, which represents feature 2. By comparing values in the graph 502 and the SKU vector values table 500, the computing system can determine that the unknown product in the image data is most similar to the product identified by SKU C. For example, products identified by SKU C have an aggregate feature value of 0.75 for feature 2. The unknown product in the image data has a value of 0.65 for feature 2, which is closest to the aggregate feature 2 value of SKU C in comparison to SKU A (0.8) and SKU B (−0.6). Moreover, the unknown product has a value of 0.42 for feature 1, which is closest to aggregate feature 1 value of SKU C in comparison to SKU A (0.12) and SKU B (0.8). Therefore, the computing system can return output 514.

The output 514 indicates that the likely product identification of the unknown product is SKU C. For example, the output 514 can list the SKUs based on highest confidence value to lowest confidence value. For example, the confidence value can be highest for SKU C. The confidence value can be second highest for SKU A, and the confidence value can be lowest for SKU B. For example, the output 514 can list only one or more most likely product identifications, as described herein.

As an example, SKU A can be associated with zucchini, SKU B can be associated with a red candy bar of a particular brand, and SKU C can be associated with a bag of chips of a particular brand. Feature 1 can be sharp corners, feature 2 can be yellow coloring, and feature 3 can be a narrowly oblong shape. Since the zucchini is closer to a yellow coloring and a narrow oblong shape, features 2 and 3 are most prevalent for the zucchini (SKU A). Since the red candy bar has sharp corners, feature 1 is most prevalent for the candy bar (SKU B). Since the bag of chips of the particular brand can have yellow packaging and somewhat sharp corners, features 1 and 2 can be most prevalent for the bag of chips (SKU C). The unknown product that is imaged can be a soft box container of tortilla chips. The container of tortilla chips can be yellow in color, which makes feature 2 prevalent. Moreover, the container can have somewhat sharp corners, thereby making feature 1 somewhat prevalent. The container may not be narrowly oblong, thereby making feature 3 the least prevalent. As a result, the computing system can identify that the soft box container of tortilla chips is most likely identified as the product associated with SKU C, which is the bag of potato chips. As shown in this example, computing system can identify which SKU is most likely associated with the imaged product. the computing system can also positively identify the SKU that is associated with the imaged product. In other words, the computing system can return an exact SKU that matches the features identified for the imaged product. Where the product classification model is trained to identify a catalog of products across the network of stores, the computing system can more likely positively identify the imaged product. In this illustrative example, where the product classification model was trained with images of the soft box container of the tortilla chips, the unknown product that is imaged during run-time can have confidence values or vector values that are most similar or otherwise identical to the values of the soft box container of tortilla chips in the image training data.

The example of FIG. 5 illustrates classification model training and product identification using only 3 known products and 3 features. For example, classification model training and/or product identification can be based on one or more additional and/or fewer products and one or more additional or fewer features. For example, the model can be trained using a catalog of all products in a store. The model can be trained using image data of all products that have been scanned and verified in the store and/or across a network of stores. For example, the model can be trained to identify a predetermined number of features. In another example, the model can be trained to identify any number of features. Other configurations are also possible.

In some implementations, the clustering techniques described in reference to FIG. 5 can also be used in combination with product shape models and/or product size models described herein. For example, a product shape model can generate values indicating likely shapes of a product in image data. These values can be clustered and mapped in n-dimensional space. The clustered shape values can then be compared to clusters of known/expected shape values to determine whether the product in the image data matches an expected or known product. As another example, a product size model can generate values indicating likely sizes of a product in image data. These values can be clustered and mapped in n-dimensional space. The clustered size values can then be compared to clusters of known/expected size values to determine whether the product in the image data matches an expected or known product. As yet another example, feature values, shape values, and size values can be determined for the product in the image data, then clustered and mapped in n-dimensional space. The clustered values can then be compared to clusters of features, shapes, and size values for known/expected products to determine whether the product in the image data matches any of the expected or known products.

Figure 6:
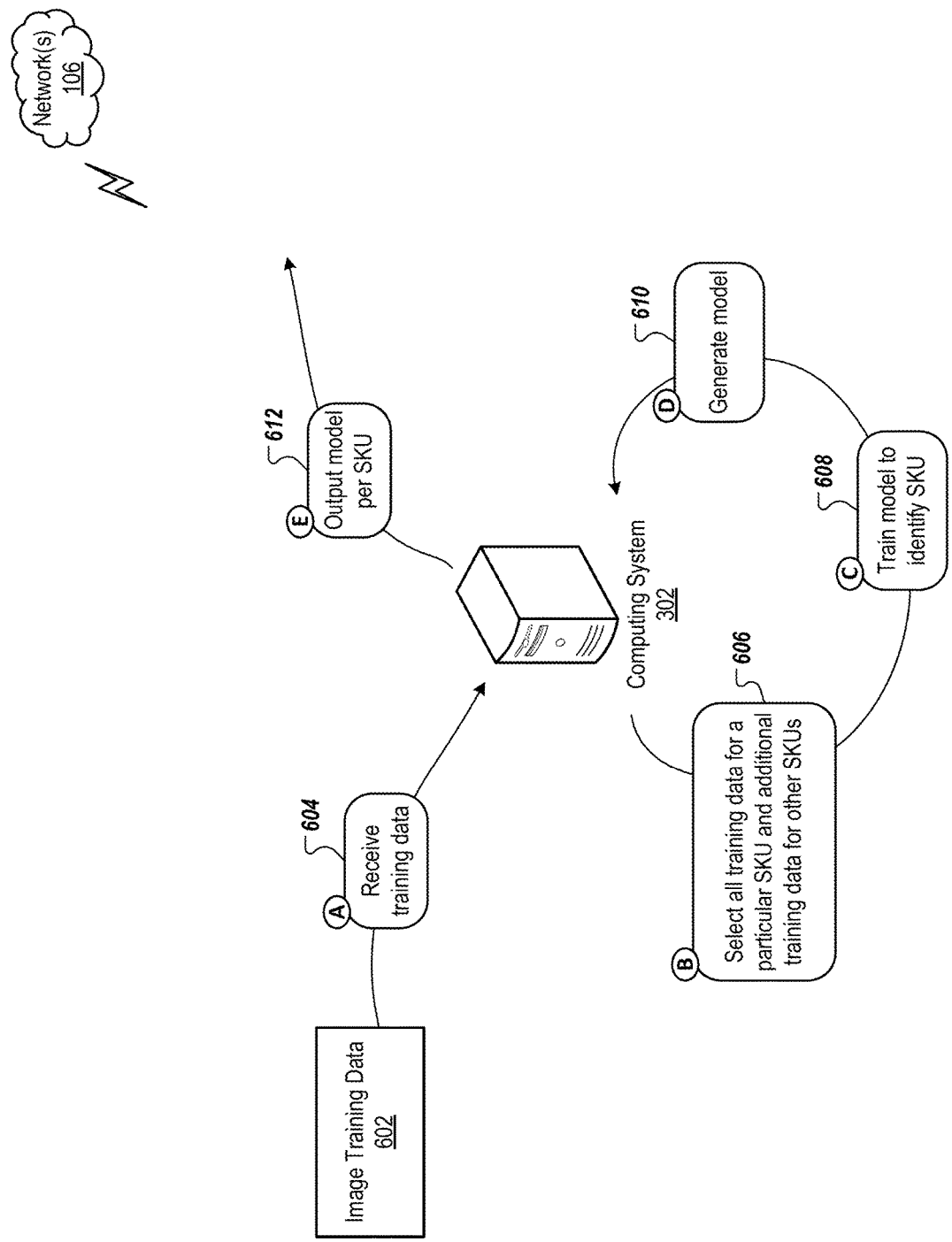
FIG. 6 is a conceptual diagram for training machine learning product identification models.

FIG. 6 is a conceptual diagram for training machine learning product identification models. Training of such models can be performed by the computing system 302 (e.g., refer to FIGS. 3A-C). As described herein, the computing system 302 can generate and train a product identification model per every verified or known SKU. The models can be trained to identify features, shapes, and/or size values of products appearing in image data. Refer to FIGS. 3A and 4A for discussion about product classification models using n-dimensional space feature values. Refer to FIGS. 3B and 4B for discussion about product shape models. Refer to FIGS. 3C and 4C for discussion about product size models. In some implementations, the computing system 302 can train and generate models for identifying and/or determining any combination of such values and/or other values. For example, a model can be trained to determine feature and shape values of a particular product. Another model can be trained to determine shape and size values of a particular product. Yet another model can be trained to determine feature and size values of a particular product. Another model can be trained to determine feature, shape, and size values of a particular product. One or more models can also be trained to determine any combination of feature, shape, size, and/or other values for a category of products (e.g., all clothing items, a group of grocery items, etc.) and/or a subset of products (e.g., all vegetables in a grocery items category).

Any of a variety of configurations can be used to train models. For example, one computing system can train the product classification model, the shape model, and/or the size model described in reference to FIGS. 3-5 and another, different computing system can train one or more other product identification models as described in FIGS. 6-7. The computing system 302 can be a remote computing system, server, network of computers or servers, and/or cloud computing system. The computing system 302 can be a centralized computing system in communication (e.g., via network(s) 106) with a plurality of edge computing devices and POS terminals at different checkout lanes across a network of stores. For example, the computing system 302 can be one of the edge computing devices at one of the checkout lanes across the network of stores. Training can be performed at the computing system 302. The product identification models that are trained by the computing system can then be transmitted to the edge computing devices at different checkout lanes across the network of stores. Execution of the models can be performed on the edge, at the edge computing devices, which can utilize less computational resources and avoid clogging network bandwidth. In some implementations, the product identification models can be the same as or similar to the product classification model, the shape model, and/or the size model described in reference to FIGS. 3-4.

Referring to FIG. 6, the computing system 302 can receive image training data 602 (step A, 604). The image training data 602 can already be annotated and/or labeled. For example, the computing system 302 can be configured to annotate and/or label the image training data 602. The image training data 602 can include images of a single verified product. As described herein, the computing system 302 can generate a product identification model per product. Each model can be identified by product SKU. The computing system 302 can generate models per product as images of those products are captured. The computing system 302 can also decide when to generate a model for a particular product. For example, the computing system 302 can generate a model for the particular product once a predetermined threshold number of images of that product are captured. As another example, the computing system 302 can access historic information about ticket switching across all the stores over one or more timeframes, and use that information to generate a model for products that are most commonly involved in ticket switching events. Thus, models may be generated for products that are frequently ticket switched rather than all products in the store. This can be beneficial to make processing of one or more product identification models during runtime more computationally efficient.

The computing system 302 can select all training data for a particular SKU and additional training data for other SKUs (step B, 606). The computing system 302 can then generate a product identification model per SKU. As an example, SKU A can have a product identification model that was trained using image training data 602 of just the product(s) having the SKU A. Similarly, SKU B can have a product identification model that was trained using image training data 602 of just the product(s) having the SKU B. For example, the image training data 602 that is selected to train each product identification model can include images of products that do not have the SKU that the model is being trained to identify. Doing so can be advantageous to train the model to identify features that are associated with the SKU and determine which features are not associated with the modeled SKU.

The computing system 302 can then train the product identification model for the particular SKU to identify product features associated with that SKU (step C, 608). The model can also be trained to identify other aspects associated with that SKU, including but not limited to shape and/or size values (e.g., refer to FIGS. 3B-C and 4B-C). The models can be trained using one or more neural networks, such as convolution neural networks (CNNs). One or more other deep learning techniques and/or algorithms can be used to train the product identification model for the particular SKU. Using a neural network, for example, features associated with the particular SKU can be identified and mapped out. The model can then be trained to identify such features and assign confidence values indicating whether, in the aggregate, image data includes one or more features that the model is trained to identify. The more features, for example, that the model identifies, the higher a confidence value that the product in the image data is the product that is identified by the model.

As an example, SKU A can be associated with chocolate cake and SKU B can be associated with granola bars. A product identification model for SKU A can be trained using image training data 602 of chocolate cakes. Some images of granola bars associated with SKU B can also be used to train the product identification model for SKU A to not identify or associate features of granola bars with features of chocolate cake. By including some image training data of the product that is not intended to be identified by the product identification model, the model can more accurately identify a product during run-time. Thus, in step C, the computing system 302 can train the model for SKU A to identify features such as a size of the chocolate cake packaging, opacity or other wrapping of the chocolate cake, color of the cake, icing, sprinkles, or other designs on the cake, roundness of corners, etc. The computing system 302 can train a model for SKU B to identify features such as size of a single granola bar, size of a granola bar box, labels on a granola bar or box, colors on granola bar or box packaging, sharpness of corners on a granola bar or bow, etc. In training the models, the computing system 302 can train the model for SKU A to identify that sharp corners (a feature of the granola bars associated with SKU B) likely are not associated with a chocolate cake and that bright blue labeling across an entirety of the product (a feature of the granola bars associated with SKU B) is not associated with a chocolate cake.

Once a product identification model is trained by the computing system 302, the computing system 302 can generate the model for each SKU (step D, 610). The computing system 302 can then output each model per SKU (step E, 612). For example, outputting each model can include storing each model in a data store (e.g., refer to FIG. 9). In another example, outputting each model can include transmitting each model to edge computing devices in a network of stores to be executed in run-time. In a further example, the models can be stored in the data store and each of the edge computing devices can retrieve, from the data store, one or more models that can be used to identify an imaged product (e.g., refer to FIG. 7). Other configurations are also possible.

Each of the models can be trained to provide output indicating a likelihood that an imaged product is the product identified by the product identification model. For example, as described in reference to the product classification model (e.g., refer to FIGS. 3-5), the output can be a confidence level that is a floating value. In another example, the output can be a binary value (e.g., True/False, Yes/No, 0/1) indicating whether or not the product is the product identified by the particular product identification model. In some implementations, the output can be one or more enumerated values that correspond to features, shape, and/or size of the product in the image data.

FIG. 7 is a flowchart of a process 700 for identifying a product using one or more of the machine learning product identification models. One or more blocks in the process 700 can be performed by the computing system 302, such as blocks 702-704. One or more blocks in the process 700 can be performed by the edge computing device 102 in each checkout lane 100 across a network of stores (e.g., refer to FIG. 1), such as blocks 706-714. For example, the process 700 can be performed at one device, such as the computing system 302 and/or the edge computing device 102. One or more blocks in the process 700 can also be performed by one or more other computing systems, servers, devices, and/or network of computers. For illustrative purposes, the process 700 is described from a perspective of a computing system.

Referring to the process 700, the computing system can receive annotated image training data for a plurality of known products in 702. Refer to step A (604) in FIG. 6. The computing system can then train identification models for each of the plurality of known products using the image training data in 704. Refer to steps B-E (606-612) in FIG. 6. As described herein, the computing system can generate an identification model for each known product. Each identification model can be trained to determine whether an imaged unknown product has features of the product associated with the identification model. Each identification model can output a confidence value indicating a likelihood that the imaged unknown product is the product associated with the model.

During run-time, the computing system can receive image data of an unknown product that is scanned at checkout (706). As described herein, one or more cameras in the checkout lane can be configured to capture images of the unknown product as a customer moves the unknown product over a flatbed scanning area (e.g., refer to FIG. 1).

The computing system can then apply one or more identification models to the received image data in 708. By applying the models, the computing system can determine confidence values that the unknown product is one or more of the products identified by the applied identification models. For example, the computing system can identify some features of the unknown product. The identified features can be used to select (e.g., retrieve from the data store) which of the identification models to apply. For example, image data can be received of a banana, an unknown product. Initial product feature identification of the banana can return features such as a yellow color, a stem, some green coloring, a narrow oblong shape, a curvature of the shape, and that no packaging surrounds the banana. The computing system can use these features to select one or more product identification models. The computing system can select a model for identifying zucchini, which is also yellow, a narrow oblong shape, and without packaging. The computing system can select a model for identifying bananas. The computing system can also select a model for identifying squash, which can sometimes be yellow, sometimes have some green coloring, can have a stem, can have a narrow oblong shape, can sometimes have some curvature, and may also not have packaging. These three models can be applied to the image data of the banana, the unknown product, in order to determine whether the banana, the unknown product, in the image data matches any of the modeled known products.

The computing system can select one or more product identification models based on a scanned barcode. For example, if the unknown product's barcode or other product identifier is scanned by one or more of the scanning devices at the checkout lane, the computing system can use the scanned barcode to select an identification model associated with a product having the scanned barcode. By applying that model, the computing system can determine whether unknown product in the image data matches the product associated with the scanned barcode. The computing system can also select models for products that are similar to the product associated with the scanned barcode. Thus, the computing system can determine whether the unknown product in the image data matches any of the products that are similar to the product associated with the scanned barcode.

Figure 11A:
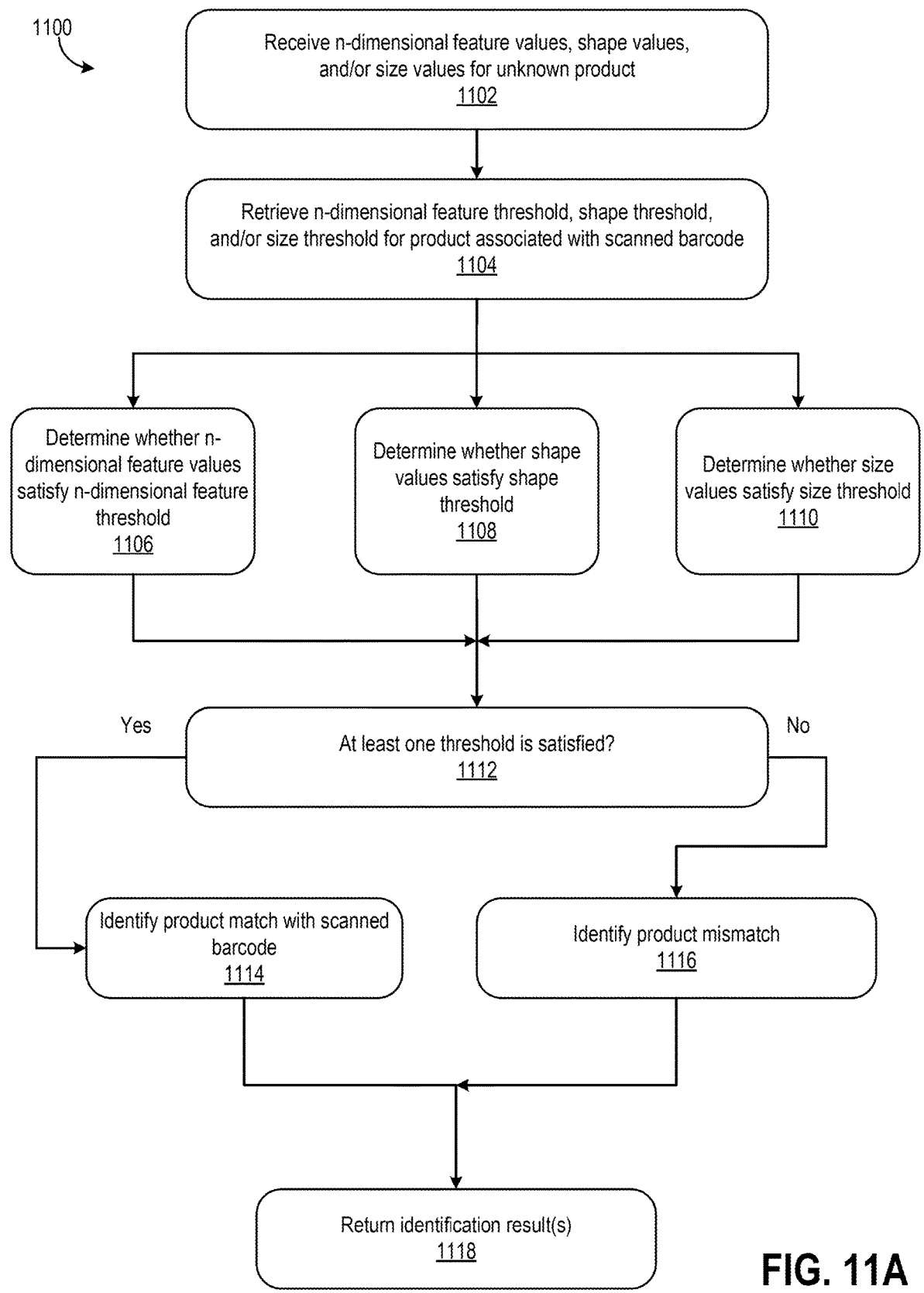
FIG. 11A is a flowchart of an example process for determining whether an unknown product matches a scanned barcode during a checkout process.
Figure 11B:
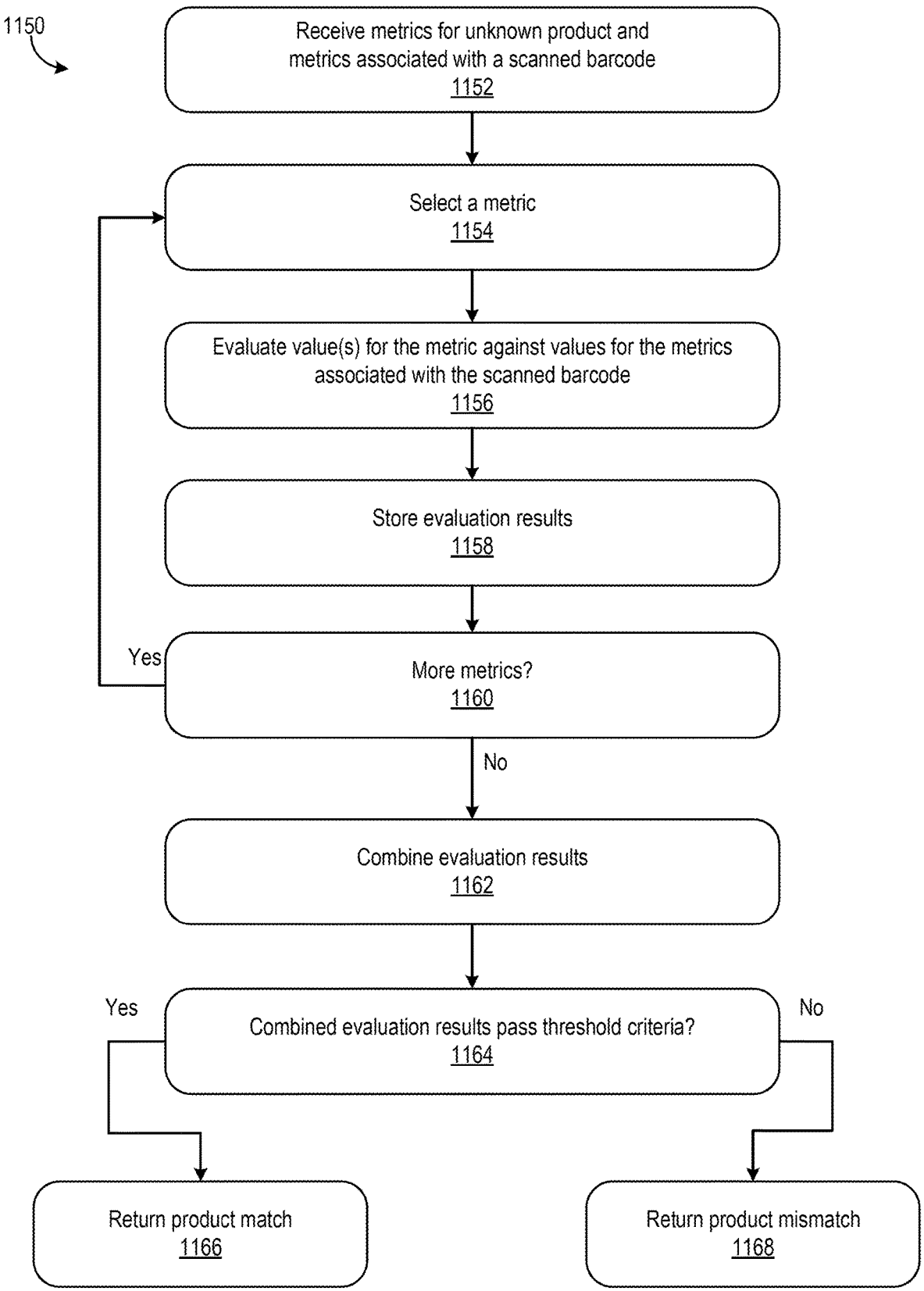
FIG. 11B is a flowchart of another example process for determining whether an unknown product matches a scanned barcode during a checkout process.

The computing system can apply a threshold number of models to try and identify the unknown product. As described herein, the computing system can apply one or more models to identify features, shape, and/or size values of the unknown product. Each of the applied models can return confidence values for each of the identified values (e.g., features, shape, and/or size), which can then be aggregated and/or ranked to identify a most likely product identification to a least likely product identification. For example, the computing system can continue to apply product identification models until one of the applied models returns a highest confidence value. Thus, the computing system can apply the models until the product can be positively identified. In some implementations, as described throughout, the computing system may not positively identify the product. Instead, the computing system can return confidence values for each of the identified features, shapes, and/or sizes of the product. The confidence values can then be compared to expected threshold confidence values for known products or a scanned barcode to determine whether the unknown product likely matches a known product or the scanned barcode. In some implementations, the confidence values can be aggregated then compared to an overall threshold confidence value for the scanned barcode to determine whether the unknown product likely matches the scanned barcode. Refer to FIGS. 11A-B for additional discussion about generating match or mismatch indications based on a combination of feature values, shape values, and/or size values determined for the unknown product.

In 710, the computing system can identify one or more candidate product identifications for the unknown product based on a comparison of the confidence values for the unknown product, in some implementations. The confidence values can be ranked from highest to lowest confidence. The highest confidence value can be a most likely match. In the example above where the unknown product is a banana, the zucchini model can return the lowest confidence value (since the least amount of zucchini features can be identified in the image data of the banana) and the banana model can return the highest confidence value (since the most amount of banana features can be identified in the image data of the banana that is being scanned during checkout).

The computing system can optionally select one or more of the candidate product identifications for the unknown product having the highest confidence value (712). In the example above where the unknown product is the banana, the computing system can select a SKU associated with the banana model since the banana model returned the highest confidence value.

Finally, the computing system can return the one or more candidate product identifications in 714. Refer to block 414 in FIG. 4A.

Figure 8:
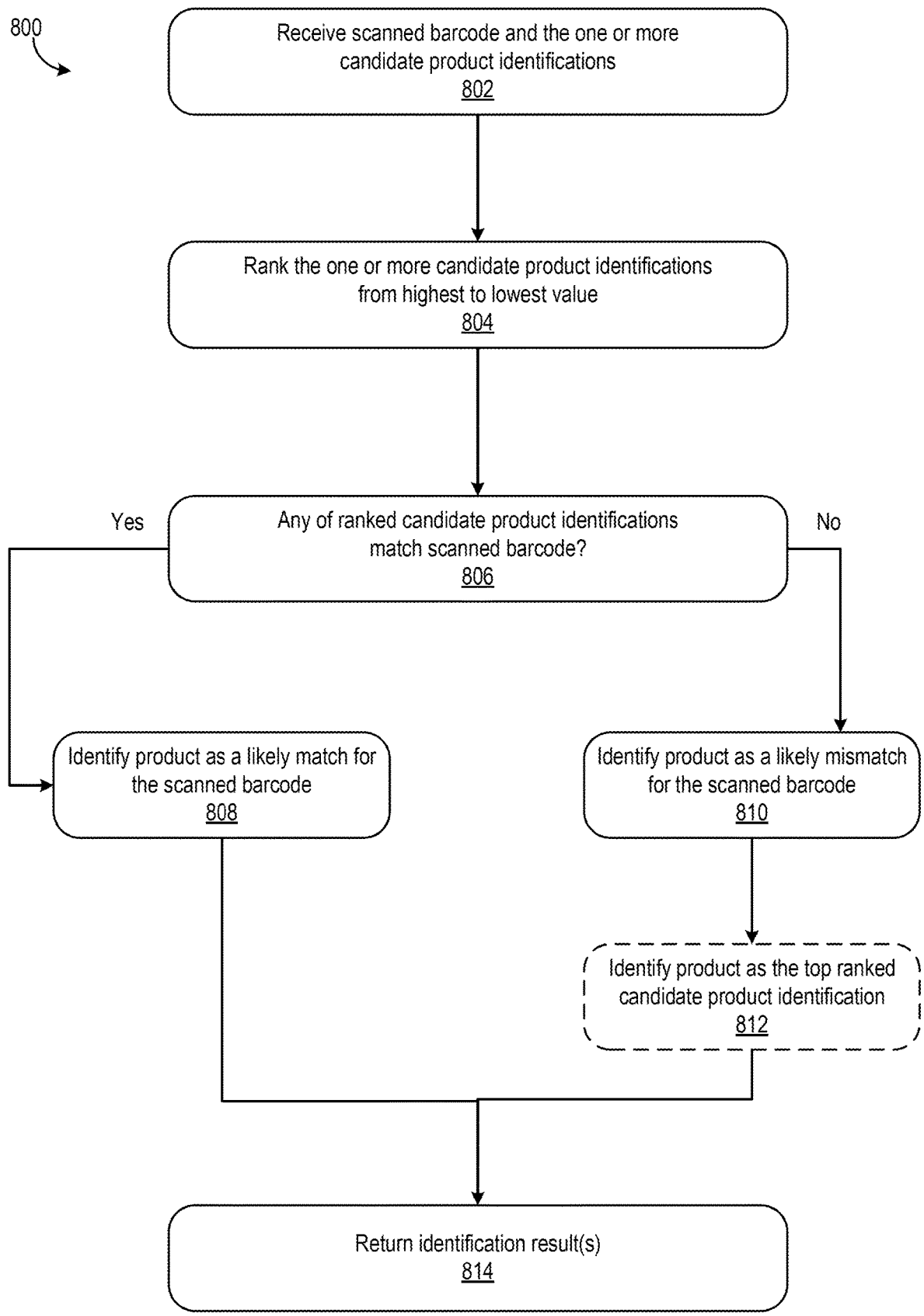
FIG. 8 is a flowchart of a process for determining whether an imaged product matches a scanned product label.

FIG. 8 is a flowchart of a process 800 for determining whether an imaged product matches a scanned product label. The process 800 can therefore be used to determine whether a customer engaged in ticket swapping (e.g., ticket switching) and is trying to purchase a product with an incorrect barcode. One or more blocks in the process 800 can be performed by each of the edge computing devices 102 across the network of stores. One or more blocks in the process 800 can also be performed by the computing system 302. For example, the process 800 can be performed at one device, such as the computing system 302 and/or the edge computing device 102. One or more blocks in the process 800 can also be performed by one or more other computing systems, servers, devices, and/or network of computers. For illustrative purposes, the process 800 is described from a perspective of a computing system.

Referring to the process 800, the computing system can receive a scanned barcode and the one or more candidate product identifications in 802. The barcode can be scanned by a scanning device at a checkout lane, such as one or more of the scanning devices 116 at the checkout lane 100 (e.g., refer to FIG. 1). A customer, for example, can place the unknown product over/on a flatbed scanner, which can recognize and scan the barcode appearing on the unknown product. For example, the barcode can be another type of label or product identifier, such as a sticker, QR code, and/or SKU. The one or more candidate product identifications can be determined by the computing system after applying the product classification model and/or multiple product identification models to image data of the unknown product associated with the scanned barcode (e.g., refer to FIGS. 4A-C and 7). Each of the received candidate product identifications can also include associated confidence values, as described herein.

The computing system can rank the one or more candidate product identifications from highest to lowest value in 804. As described herein, the ranking/sorting can be based on confidence values that indicate a likelihood that the imaged product is one or more of the candidate product identifications. For example, as described herein, the computing system can rank the candidate product identifications after applying the classification model and/or the product identification models.

Once ranked, the computing system can determine whether any of the ranked candidate product identifications match the scanned barcode in 806. The computing system can start from highest ranked candidate product identification down to the lowest ranked candidate product identification. After all, the highest ranked candidate product identification more likely identifies the product in the image data. If the highest ranked candidate product identification matches a product associated with the scanned barcode, then the customer is not engaged in ticket swapping. In other words, the customer is most likely purchasing the product that is associated with the scanned barcode and therefore is paying an appropriate or actual price of the product. If none of the ranked candidate product identifications match the scanned barcode, then the customer is likely engaged in ticket swapping. In other words, the customer most likely swapped the barcode on the product that the customer is actually purchasing so that they would not have to pay the actual price associated with the product.

For example, if a low ranked candidate product identification matches the scanned barcode, this can raise some suspicion as to whether or not the customer engaged in ticket swapping. However, the ticket swapping in such a scenario may be minimal and therefore may not warrant some action to be taken to stop the customer. For example, a banana can have a candidate product identification of zucchini, as mentioned above. If the customer is actually purchasing a banana but the customer put a barcode sticker on the banana that belongs to a zucchini, the computing system may identify that the low ranked candidate product identification of zucchini matches the scanned barcode. This match can indicate that the customer might have swapped the barcode on the banana with that of the zucchini. However, a price difference between the banana and the zucchini can be so minimal or low that this barcode swapping may not be egregious or warrant any type of action to be taken against the customer.

Still referring to the process 800 in FIG. 8, if any of the ranked candidate product identifications match the scanned barcode in 806, the computing system can identify the product as a likely match for the scanned barcode in 808. Thus, the computing system can determine that the customer likely is not engaging in ticket swapping.

On the other hand, if none of the ranked candidate product identifications match the scanned barcode in 806, then the computing system can identify the product as a likely mismatch for the scanned barcode 810. Thus, the computing system can determine that the customer is likely engaging in ticket swapping. Refer to FIGS. 11A-B for additional discussion about determining whether any of the ranked candidate product identifications match the scanned barcode.

The computing system can optionally identify the product as the top ranked candidate product identification in 812. Positively identifying the product in 812 can be advantageous to determine whether the customer swapped the barcode of the product with a product whose price is very different. In other words, identification in 812 can be advantageous to determine a seriousness or severity of the customer's ticket swapping.

For example, if the product that is actually being purchased is identified in 812 as a cellphone but the scanned barcode is associated with a DVD, the computing system and/or an in-store employee can determine that the price difference between the cellphone and the DVD is very large or greater than a certain threshold value. Consequently, the computing system and/or the in-store employee can conclude that the customer is engaging in a serious ticket swapping incident that warrants some action to be taken, such as stopping the customer from leaving the store with the cellphone for which they did not pay the actual price.

Finally, the computing system can return the identification result(s) in 814. For example, the computing system can return a determination that the product likely matches the scanned barcode (block 808). The computing system can return a determination that the product likely mismatches the scanned barcode (block 810). The computing system can also return a determination that the product is the top ranked candidate product identification (block 812).

As described herein, the identification result(s) of 814 can be stored in a data store. The identification result(s) can also be transmitted to one or more devices, computing systems, and/or servers, including but not limited to an edge computing device, a POS terminal, and/or a monitoring device of an in-store employee. For example, the identification result(s) can be outputted at the display 113 of the edge computing device 102 at the checkout lane 100 in FIG. 1. That way, the customer 118 can be presented with an indication of what product they are actually purchasing. Moreover, the identification result(s) can be transmitted to the POS terminal 103 at the checkout lane 100 such that the customer 118's bill can be updated to reflect the actual price of the product that is being purchased, rather than the price associated with the scanned barcode (e.g., in a scenario where the customer 118 engages in ticket swapping). As another example, the identification result(s) can be transmitted to the user mobile device of the in-store employee, whose job can be directed to safety and security of a store or network of stores. The in-store employee can review the identification result(s) and assess the customer's actions. The in-store employee can determine a severity of the customer's actions, when they are engaged in ticket swapping. Moreover, the in-store employee can determine what action to take to monitor the customer, apprehend the customer, or otherwise prevent the customer from leaving the store with the product that is identified as a mismatch with the scanned barcode.

Figure 9:
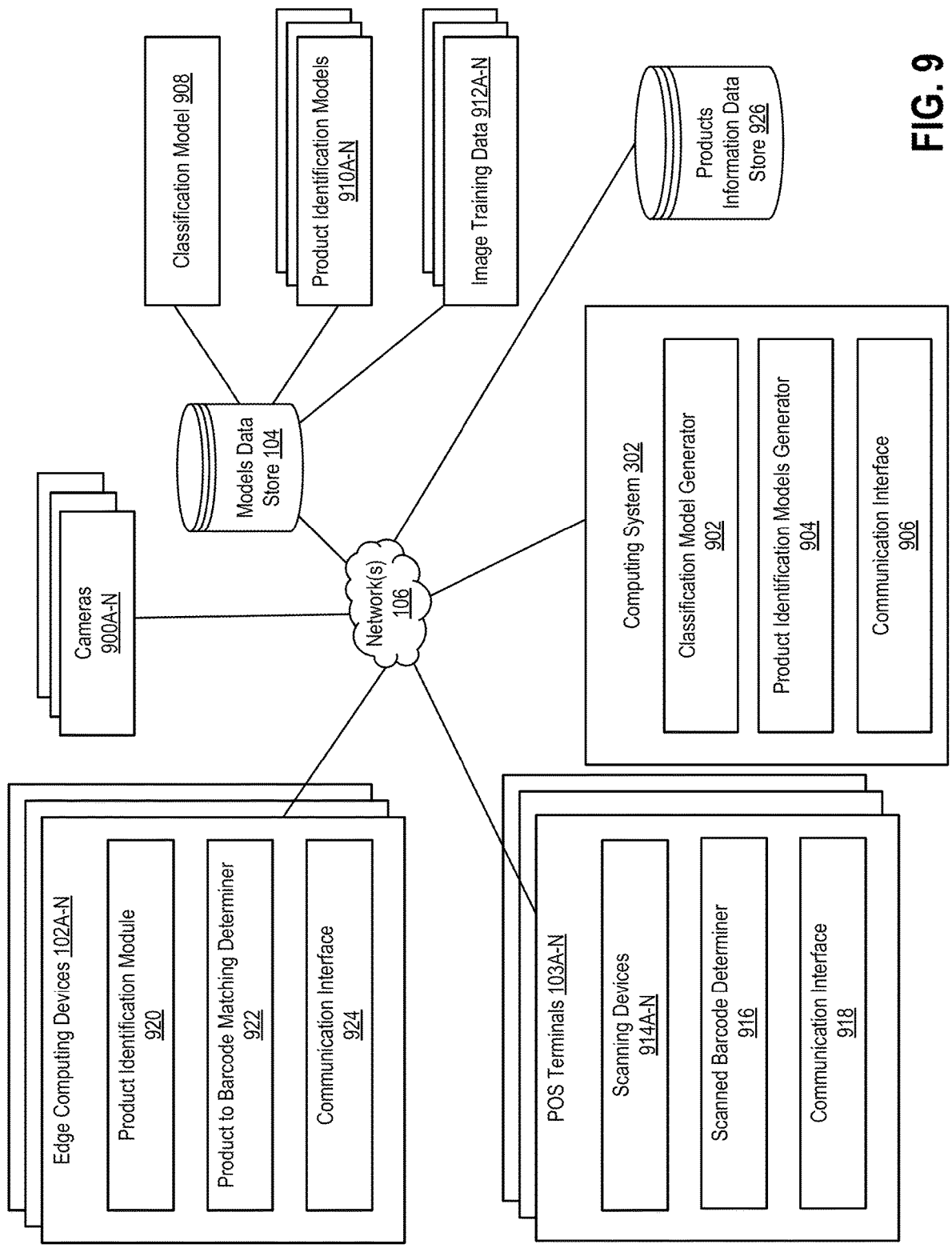
FIG. 9 is a system diagram of one or more components used to perform the techniques described herein.

FIG. 9 is a system diagram of one or more components used to perform the techniques described herein. As described herein, edge computing devices 102A-N, POS terminals 103A-N, computing system 302, and models data store 104 can be in communication (e.g., wired and/or wireless) over the network(s) 106. One or more cameras 900A-N can also communicate via the network(s) 106. The cameras 900A-N can include any of the cameras described herein, such as the overhead camera 110, the embedded camera 112 in the display screen 113 of the edge computing device 102, and/or the flatbed camera 202 (e.g., refer to FIGS. 1-2). For example, one or more of the edge computing devices 102A-N, the cameras 900A-N, the POS terminals 103A-N, and/or the computing system 302 can be part of a same computing system. For example, one or more of the components of the edge computing devices 102A-N, the cameras 900A-N, the POS terminals 103A-N, and the computing system 302 can be part of a same or similar computing system.

The computing system 302 can include a classification model generator 902, a product identification models generator 904, and a communication interface 906. The classification model generator 902 can be configured to generate and train the product classification model as described throughout this disclosure (e.g., refer to FIGS. 3-5). The product classification model can be trained using image training data 912A-N. The image training data 912A-N can be retrieved, by the computing system 302, from the models data store 104. As described herein, the computing system 302 can also receive the image training data 912A-N directly from one or more of the cameras 900A-N. The generated classification model can be stored as classification model 908 in the models data store 104. The classification model 908 can then be retrieved by any of the edge computing devices 102A-N during run-time. As described herein, the classification model 908 can be transmitted to and stored at one or more of the edge computing devices 102A-N for run-time use on the edge.

The product identification models generator 904 can be configured to generate and train product identification models as described throughout this disclosure (e.g., refer to FIGS. 6-7). The models can be trained using image training data 912A-N. The image training data 912A-N can be retrieved, by the computing system 302, from the models data store 104. As described herein, the computing system 302 can also receive the image training data 912A-N directly from one or more of the cameras 900A-N. The generated identification models can be stored as product identification models 910A-N in the models data store 104. The models 910A-N can then be retrieved by any of the edge computing devices 102A-N during run-time. As described herein, the models 910A-N can be transmitted to and stored at one or more of the edge computing devices 102A-N for run-time use on the edge.

The POS terminals 103A-N can each include scanning devices 914A-N, a scanned barcode determiner 916, and a communication interface 918. The POS terminals 103A-N can be positioned at each checkout lane in a retail store. The POS terminals 103A-N can present information to a user as they are checking out. For example, the POS terminals 103A-N can output information such as products that have been scanned by the user, prices of the scanned products, options to search for products that may or may not have identifying labels, etc. The POS terminals 103A-N can also be configured to present a final bill to the user and receive a form of payment from the user to complete the checkout process.

The scanning devices 914A-N can include devices configured to scan or otherwise identify barcodes, QR codes, labels, RFID tags, and/or SKUs (e.g., refer to the scanning devices 116 in FIG. 1). For example, the scanning devices 914A-N can include a handheld scanner that a user can point or direct towards a label on a product to be purchased. The scanning devices 914A-N can also include a flatbed scanner. The user can move a product over the flatbed scanner, which can be configured to identify a label on the product. The scanning devices 914A-N may also include heat sensors, a scale, or other weight sensors that can be used to identify a product to be purchased. Moreover, the scanning devices 914A-N can include cameras, such as the flatbed camera 202 (e.g., refer to FIG. 2).

The scanned barcode determiner 916 can be configured to identify a product based on a barcode or other label that is scanned by the scanning devices 914A-N. For example, the scanned barcode determiner 916 can receive the scanned barcode from the scanning devices 914A-N. The determiner 916 can retrieve product information from a products information data store 926 using the scanned barcode. For example, the determiner 916 can match the scanned barcode with a SKU of a product in the products information data store 926. Once the scanned barcode is matched with a product, the determiner 916 can identify a price for that product. The price can be outputted to the user at a display of the POS terminal and/or another display screen at the checkout lane (e.g., the display screen 113 in FIG. 1).

The edge computing devices 102A-N can each include a product identification module 920, a product to barcode matching determiner 922, and a communication interface 924. As described herein, the edge computing devices 102A-N can be deployed at checkout lanes across a network of stores. Each checkout lane can include an edge computing device. The edge computing devices 102A-N can be configured to make determinations of whether products that the user is purchasing at the particular checkout lane match the barcodes that are scanned by the scanning devices 914A-N. The edge computing devices 102A-N can provide for lightweight and fast determinations to be made on the edge, which can avoid clogging network bandwidth.

The product identification module 920 can be configured to identify products that are being scanned by the user at the checkout lane using the techniques described herein (e.g., refer to FIGS. 4 and 7). As described throughout, the module 920 can receive image data of an unknown scanned product from the cameras 900A-N. The module 920 can apply one or more machine learning models to the image data in order to identify the unknown scanned product. Identifying the product can include generating a list of candidate product identifications. Each of the candidate product identifications can have a confidence value indicating how likely the unknown product is the candidate product identification.

The module 920 can use one or more of the classification model 908 and/or the product identification models 910A-N to identify the products. The classification model 908 and/or the product identification models 910A-N can include any of the models described herein, including but not limited to product classification models that use n-dimensional space feature values (e.g., refer to FIGS. 3A and 4A), product shape models (e.g., refer to FIGS. 3B and 4B), product size models (e.g., refer to FIGS. 3C and 4C), or any combination thereof. The classification model 908 and/or the product identification models 910A-N can be stored at the edge computing devices 102A-N, thereby providing quick access, decreasing computation resources required to identify the products, and avoiding clogging network bandwidth. For example, the edge computing devices 102A-N can retrieve one or more of the classification model 908 and/or the product identification models 910A-N from the models data store 104.

For example, a first edge computing device in a first store can retrieve the classification model 908 from the models data store 104 while a second edge computing device in a second store can retrieve a plurality of the product identification models 910A-N from the models data store 104. The edge computing devices can determine which model or models to retrieve based on what products are being scanned (e.g., what SKUs or other product labels are being identified during a checkout process). Sometimes, the edge computing devices can load into memory one or more models for products that are likely to be involved in ticket switching events. Products that are likely to be involved in ticket switching events can be lower value products and/or products that historically have been involved in ticket switching events. The models loaded into memory can be determined based on historic trends (e.g., over a course of days, weeks, months, etc.) in ticket switching and/or current (e.g., daily) trends in ticket switching. Sometimes, a finite number of models can be loaded into the edge computing devices and prioritized for use by the edge computing devices in a variety of ways (e.g., based on what product SKU has been identified, whether the scanned SKU corresponds to a price that exceeds some threshold amount, etc.).

As another example, an edge computing device can make a selection of multiple product identification models 910A-N based on a preliminary identification of a product that is scanned by the user with the scanning devices 914A-N. The preliminary identification of the product can reveal that the product is possibly one or more different types of products. The edge computing device can then retrieve the product identification models 910A-N that are associated with the possible product identifications.

As yet another example, an edge computing device can make a selection of multiple product identification models 910A-N based on the scanned barcode determiner 916's determination of what product is identified by the scanned barcode. The edge computing device can retrieve product identification models 910A-N for the product identified by the scanned barcode and one or more other products that may or may not be similar to the product identified by the scanned barcode.

The product to barcode matching determiner 922 can be configured to determine whether the identified product matches the scanned barcode using the techniques described herein (e.g., refer to FIG. 8). The determiner 922 can use one or more machine learning models to determine whether the identified product matches the scanned barcode. The determiner 922 can receive the product information associated with the scanned barcode from the scanned barcode determiner 916 of the POS terminals 103A-N. The determiner 922 can also receive the list of candidate product identifications from the product identification module 920. The determiner 922 can compare the confidence values of the candidate product identifications to the product information associated with the scanned barcode. If any of the candidate product identifications match the scanned barcode, then the determiner 922 can determine that the user most likely did not engage in ticket swapping. Thus, the determiner 922 may not positively identify the product but rather just check whether the product is most likely a produce associated with the scanned barcode. As described herein, the determiner 922 can positively identify the product, especially when there is a mismatch between the identified product and the scanned barcode. If there are no matches between the list of candidate product identifications and the scanned barcode, then the determiner 922 can determine that there is a mismatch and that the user most likely engaged in ticket swapping.

Matching results generated by the determiner 922 can be transmitted to the POS terminals 103A-N. For example, the POS terminals 103A-N can output an actual price for the identified product when the barcode matching determiner 922 identifies a mismatch between the product and the scanned barcode. The POS terminals 103A-N can also allow for completion of a checkout process based on whether there is a match or mismatch. In some implementations where there is a mismatch, the POS terminals 103A-N can allow the checkout process to complete because a difference in price between the scanned barcode and the identified product is minimal or below a predetermined threshold value. In some implementations where there is a mismatch, the POS terminals 103A-N can prohibit the checkout process from completing when the difference in price exceeds the predetermined threshold value (e.g., the user scanned a barcode for a book but the actual product being purchased is a smartphone). In yet other implementations, the POS terminals 103A-N can be configured to output recommendations to the user about what products the user is purchasing. For example, where there is a mismatch, the POS terminal 103A-N can output one or more of the candidate product identifications. The user can then select the candidate product identification that matches the actual product that the user is purchasing. The user-selected candidate product identification can then be added to the user's transaction. Moreover, the user's selection can be used to further train and/or improve one or more of the classification model 908, the product identification models 910A-N, and/or the product to barcode matching determiner 922.

As described throughout this disclosure, matching results generated by the product to barcode matching determiner 922 can also be transmitted to a user device of an in-store employee. The in-store employee can use the matching results to make decisions about monitoring and/or apprehending the user. The in-store employee can also use the matching results to make determinations of shortages of products in the store and whether those shortages are attributed to theft, ticket swapping, or other security-related incidents.

Finally, the communication interfaces 906, 918, and 924 can be configured to provide for communication between one or more of the components and/or systems or devices described herein, via the network(s) 106.

Figure 10:
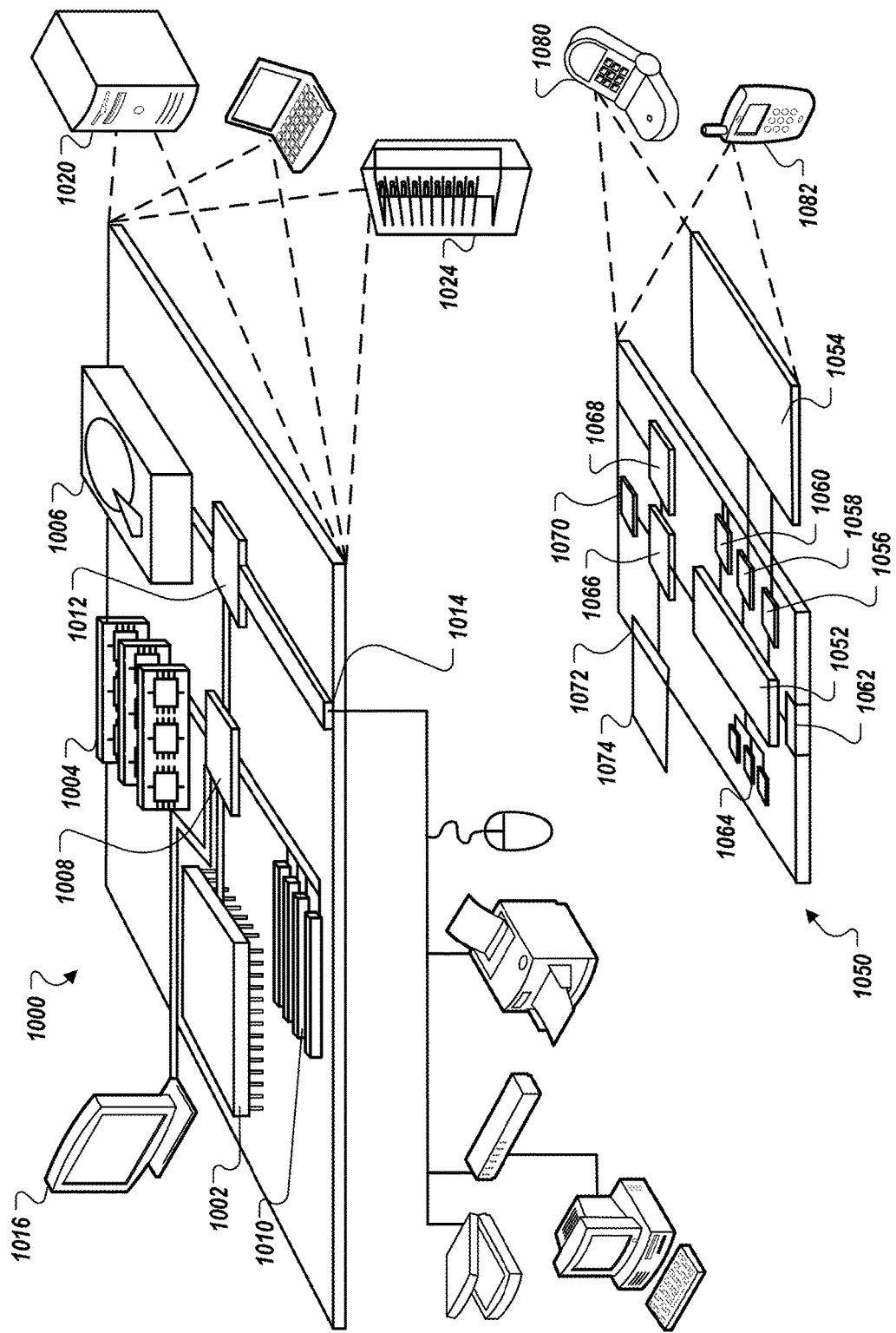
FIG. 10 is a schematic diagram that shows an example of a computing device and a mobile computing device that can be used to perform the techniques described herein.

FIG. 10 shows an example of a computing device 1000 and an example of a mobile computing device that can be used to implement the techniques described here. The computing device 1000 is intended to represent various forms of digital computers, such as laptops, desktops, workstations, personal digital assistants, servers, blade servers, mainframes, and other appropriate computers. The mobile computing device is intended to represent various forms of mobile devices, such as personal digital assistants, cellular telephones, smart-phones, and other similar computing devices. The components shown here, their connections and relationships, and their functions, are meant to be exemplary only, and are not meant to limit implementations of the inventions described and/or claimed in this document.

The computing device 1000 includes a processor 1002, a memory 1004, a storage device 1006, a high-speed interface 1008 connecting to the memory 1004 and multiple high-speed expansion ports 1010, and a low-speed interface 1012 connecting to a low-speed expansion port 1014 and the storage device 1006. Each of the processor 1002, the memory 1004, the storage device 1006, the high-speed interface 1008, the high-speed expansion ports 1010, and the low-speed interface 1012, are interconnected using various busses, and can be mounted on a common motherboard or in other manners as appropriate. The processor 1002 can process instructions for execution within the computing device 1000, including instructions stored in the memory 1004 or on the storage device 1006 to display graphical information for a GUI on an external input/output device, such as a display 1016 coupled to the high-speed interface 1008. In other implementations, multiple processors and/or multiple buses can be used, as appropriate, along with multiple memories and types of memory. Also, multiple computing devices can be connected, with each device providing portions of the necessary operations (e.g., as a server bank, a group of blade servers, or a multi-processor system).

The memory 1004 stores information within the computing device 1000. In some implementations, the memory 1004 is a volatile memory unit or units. In some implementations, the memory 1004 is a non-volatile memory unit or units. The memory 1004 can also be another form of computer-readable medium, such as a magnetic or optical disk.

The storage device 1006 is capable of providing mass storage for the computing device 1000. In some implementations, the storage device 1006 can be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product can also contain instructions that, when executed, perform one or more methods, such as those described above. The computer program product can also be tangibly embodied in a computer- or machine-readable medium, such as the memory 1004, the storage device 1006, or memory on the processor 1002.

The high-speed interface 1008 manages bandwidth-intensive operations for the computing device 1000, while the low-speed interface 1012 manages lower bandwidth-intensive operations. Such allocation of functions is exemplary only. In some implementations, the high-speed interface 1008 is coupled to the memory 1004, the display 1016 (e.g., through a graphics processor or accelerator), and to the high-speed expansion ports 1010, which can accept various expansion cards (not shown). In the implementation, the low-speed interface 1012 is coupled to the storage device 1006 and the low-speed expansion port 1014. The low-speed expansion port 1014, which can include various communication ports (e.g., USB, Bluetooth, Ethernet, wireless Ethernet) can be coupled to one or more input/output devices, such as a keyboard, a pointing device, a scanner, or a networking device such as a switch or router, e.g., through a network adapter.

The computing device 1000 can be implemented in a number of different forms, as shown in the figure. For example, it can be implemented as a standard server 1020, or multiple times in a group of such servers. In addition, it can be implemented in a personal computer such as a laptop computer 1022. It can also be implemented as part of a rack server system 1024. Alternatively, components from the computing device 1000 can be combined with other components in a mobile device (not shown), such as a mobile computing device 1050. Each of such devices can contain one or more of the computing device 1000 and the mobile computing device 1050, and an entire system can be made up of multiple computing devices communicating with each other.

The mobile computing device 1050 includes a processor 1052, a memory 1064, an input/output device such as a display 1054, a communication interface 1066, and a transceiver 1068, among other components. The mobile computing device 1050 can also be provided with a storage device, such as a micro-drive or other device, to provide additional storage. Each of the processor 1052, the memory 1064, the display 1054, the communication interface 1066, and the transceiver 1068, are interconnected using various buses, and several of the components can be mounted on a common motherboard or in other manners as appropriate.

The processor 1052 can execute instructions within the mobile computing device 1050, including instructions stored in the memory 1064. The processor 1052 can be implemented as a chipset of chips that include separate and multiple analog and digital processors. The processor 1052 can provide, for example, for coordination of the other components of the mobile computing device 1050, such as control of user interfaces, applications run by the mobile computing device 1050, and wireless communication by the mobile computing device 1050.

The processor 1052 can communicate with a user through a control interface 1058 and a display interface 1056 coupled to the display 1054. The display 1054 can be, for example, a TFT (Thin-Film-Transistor Liquid Crystal Display) display or an OLED (Organic Light Emitting Diode) display, or other appropriate display technology. The display interface 1056 can comprise appropriate circuitry for driving the display 1054 to present graphical and other information to a user. The control interface 1058 can receive commands from a user and convert them for submission to the processor 1052. In addition, an external interface 1062 can provide communication with the processor 1052, so as to enable near area communication of the mobile computing device 1050 with other devices. The external interface 1062 can provide, for example, for wired communication in some implementations, or for wireless communication in other implementations, and multiple interfaces can also be used.

The memory 1064 stores information within the mobile computing device 1050. The memory 1064 can be implemented as one or more of a computer-readable medium or media, a volatile memory unit or units, or a non-volatile memory unit or units. An expansion memory 1074 can also be provided and connected to the mobile computing device 1050 through an expansion interface 1072, which can include, for example, a SIMM (Single In Line Memory Module) card interface. The expansion memory 1074 can provide extra storage space for the mobile computing device 1050, or can also store applications or other information for the mobile computing device 1050. Specifically, the expansion memory 1074 can include instructions to carry out or supplement the processes described above, and can include secure information also. Thus, for example, the expansion memory 1074 can be provide as a security module for the mobile computing device 1050, and can be programmed with instructions that permit secure use of the mobile computing device 1050. In addition, secure applications can be provided via the SIMM cards, along with additional information, such as placing identifying information on the SIMM card in a non-hackable manner.

The memory can include, for example, flash memory and/or NVRAM memory (non-volatile random access memory), as discussed below. In some implementations, a computer program product is tangibly embodied in an information carrier. The computer program product contains instructions that, when executed, perform one or more methods, such as those described above. The computer program product can be a computer- or machine-readable medium, such as the memory 1064, the expansion memory 1074, or memory on the processor 1052. In some implementations, the computer program product can be received in a propagated signal, for example, over the transceiver 1068 or the external interface 1062.

The mobile computing device 1050 can communicate wirelessly through the communication interface 1066, which can include digital signal processing circuitry where necessary. The communication interface 1066 can provide for communications under various modes or protocols, such as GSM voice calls (Global System for Mobile communications), SMS (Short Message Service), EMS (Enhanced Messaging Service), or MMS messaging (Multimedia Messaging Service), CDMA (code division multiple access), TDMA (time division multiple access), PDC (Personal Digital Cellular), WCDMA (Wideband Code Division Multiple Access), CDMA2000, or GPRS (General Packet Radio Service), among others. Such communication can occur, for example, through the transceiver 1068 using a radio-frequency. In addition, short-range communication can occur, such as using a Bluetooth, WiFi, or other such transceiver (not shown). In addition, a GPS (Global Positioning System) receiver module 1070 can provide additional navigation- and location-related wireless data to the mobile computing device 1050, which can be used as appropriate by applications running on the mobile computing device 1050.

The mobile computing device 1050 can also communicate audibly using an audio codec 1060, which can receive spoken information from a user and convert it to usable digital information. The audio codec 1060 can likewise generate audible sound for a user, such as through a speaker, e.g., in a handset of the mobile computing device 1050. Such sound can include sound from voice telephone calls, can include recorded sound (e.g., voice messages, music files, etc.) and can also include sound generated by applications operating on the mobile computing device 1050.

The mobile computing device 1050 can be implemented in a number of different forms, as shown in the figure. For example, it can be implemented as a cellular telephone 1080. It can also be implemented as part of a smart-phone 1082, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms machine-readable medium and computer-readable medium refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term machine-readable signal refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network (LAN), a wide area network (WAN), and the Internet.

The computing system can include clients and servers. A client and server are generally remote from each other and typically interact through a communication network. The relationship of client and server arises by virtue of computer programs running on the respective computers and having a client-server relationship to each other.

FIG. 11A is a flowchart of an example process 1100 for determining whether an unknown product matches a scanned barcode during a checkout process. In some implementations, the process 1100 can be performed as part of block 806 in the process 800 of FIG. 8 to determine whether any of ranked candidate product identifications match a scanned barcode. One or more blocks in the process 1100 can be performed by each of the edge computing devices 102 across the network of stores. One or more blocks in the process 1100 can also be performed by the computing system 302. For example, the process 1100 can be performed at one device, such as the computing system 302 and/or the edge computing device 102. One or more blocks in the process 1100 can also be performed by one or more other computing systems, servers, devices, and/or network of computers. For illustrative purposes, the process 1100 is described from a perspective of a computing system.

Referring to the process 1100 in FIG. 11A, the computing system can receive n-dimensional feature values, shape values, and/or size values for an unknown product in block 1102. Such values can be determined by applying any of the models described herein in reference to FIGS. 3-4 to image data of the unknown product.

In block 1104, the computing system can retrieve an n-dimensional feature threshold, shape threshold, and/or size threshold for a product associated with a scanned barcode during checkout. For example, the computing system can retrieve, from a data store, expected values or ranges of values for n-dimensional features, shapes, and/or sizes that are known for the product associated with the barcode that was scanned during the checkout process.

The computing system can determine whether the n-dimensional feature values satisfy the n-dimensional feature threshold (block 1106). The computing system can determine whether the n-dimensional feature values match the expected n-dimensional feature values for the product associated with the scanned barcode. The computing system can determine whether the n-dimensional feature values are within a threshold range of the expected n-dimensional feature values for the product associated with the scanned barcode. If either condition is true, then the n-dimensional feature threshold can be satisfied.

In addition or alternatively, the computing system can determine whether the shape values satisfy the shape threshold (block 1108). The computing system can determine whether the shape values match the expected shape values for the product associated with the scanned barcode. The computing system can determine whether the shape values are within a threshold range of the expected shape values for the product associated with the scanned barcode. If either condition is true, then the shape threshold can be satisfied.

In addition or alternatively, the computing system can determine whether the size values satisfy the size threshold (block 1110). The computing system can determine whether the size values match the expected size values for the product associated with the scanned barcode. The computing system can determine whether the size values are within a threshold range of the expected size values for the product associated with the scanned barcode. If either condition is true, then the size threshold can be satisfied.

Any combination of the blocks 1106-1110 can be performed. In some implementations, any combination of the blocks 1106-1110 can be performed at a same time. In some implementations, any combination of the blocks 1106-1110 can be performed in one or more orders (e.g., block 1108 can be performed first, then block 1106 followed by block 1110). One or more other combinations of the blocks 1106-1110 and/or ordering of any one or more of the blocks 1106-1110 can also be realized in the process 1100.

In block 1112, the computing system can determine whether at least one threshold is satisfied. If any one of the n-dimensional feature threshold, shape threshold, and size threshold is satisfied for the product associated with the scanned barcode, then the unknown product likely matches the scanned barcode. Therefore, if at least one threshold is satisfied, the computing system can identify a product match with the scanned barcode in block 1114. The computing system can then return the identification result(s) in block 1118.

If at least one threshold is not satisfied in block 1112, the computing system can identify a product mismatch in block 1116. In other words, if at least one threshold is not satisfied, then none of the thresholds are satisfied, and the unknown product likely does not match the product associated with the scanned barcode. The user might have engaged in ticket swapping (e.g., ticket switching). The computing system can then return the identification result(s) in block 1118.

FIG. 11B is a flowchart of another example process 1150 for determining whether an unknown product matches a scanned barcode during a checkout process. In some implementations, the process 1150 can be performed as part of block 806 in the process 800 of FIG. 8 to determine whether any of ranked candidate product identifications match a scanned barcode. One or more blocks in the process 1150 can be performed by each of the edge computing devices 102 across the network of stores. One or more blocks in the process 1150 can also be performed by the computing system 302. For example, the process 1150 can be performed at one device, such as the computing system 302 and/or the edge computing device 102. One or more blocks in the process 1150 can also be performed by one or more other computing systems, servers, devices, and/or network of computers. For illustrative purposes, the process 1150 is described from a perspective of a computing system.

Referring to the process 1150 in FIG. 11B, the computing system can receive metrics for an unknown product and metrics associated with a scanned barcode in block 1152. The metrics can represent one or more signals by which the unknown product is or can be assessed/analyzed. For example, the metrics can include n-dimensional features, size, and/or shape values. The metrics can be one or more other values that are identified and/or determined by any of the models described throughout this disclosure. As an example, the computing system can receive n-dimensional feature values, size values, and/or shape values that have been determined for the unknown product from the image data using one or more of the models described in reference to FIGS. 3-4. The computing system can also receive the metrics associated with a product barcode that was scanned during a checkout process, as described herein. These metrics can be received from the data store and/or directly from a POS terminal or other part of a checkout lane system where the checkout process is occurring.

In block 1154, the computing system can select a metric. For example, the computing system can select any one or more of n-dimensional features, size, and/or shape values by which to assess/analyze the unknown product.

The computing system can evaluate one or more value(s) for the metric against values for the metrics associated with the scanned barcode in block 1156. For example, the computing system can compare the selected n-dimensional feature values, size values, and/or shape values to expected corresponding threshold values of a product associated with the scanned barcode during the checkout process, as described herein. As a result, the computing system can determine whether the selected values match expected values for the product associated with the scanned barcode. As described further below, whether the selected values match the expected values indicate whether the unknown product likely matches the scanned barcode.

The computing system can store the evaluation results in block 1158. For example, if the computing system determines that the size values for the unknown product match the expected size values for the product associated with the scanned barcode, the computing system can generate a binary value, such as True or 1, which can be stored in a data store in association with the unknown product. As another example, if the computing system determines that the size values for the unknown product does not match the expected size values for the product associated with the scanned barcode, the computing system can generate a binary value, such as False or 0, which can be stored in the data store with or otherwise linked to the unknown product.

In block 1160, the computing system can determine whether there are more metrics for the unknown product. For example, if the computing system performed blocks 1156-1158 for the metric corresponding to n-dimensional features, the computing system can then perform the blocks 1156-1158 for the metric corresponding to shape. As another example, the computing system can then perform the blocks 1156-1158 for the metric corresponding to size. Accordingly, if there are more metrics, the computing system can return to block 1154. If there are no more metrics to assess, the computing system can proceed to block 1162.

In block 1162, the computing system can combine the evaluation results. The evaluation results can be aggregated. The computing system can combine the evaluation results into a binary value, such as I/O and/or True/False. A binary value of 1 or True can indicate, for example, that the unknown product likely matches the scanned barcode while a binary value of 0 or False can indicate, for example, that the unknown product likely does not match the scanned barcode. The computing system can also combine the evaluation results into a confidence or distance value. The confidence or distance value can be a float type value along a range indicating a likelihood that the unknown product matches the scanned barcode. The computing system can also generate a confidence value for each of the evaluation results. For example, the computing system can generate a confidence value for n-dimensional features, a confidence value for shape features, and a confidence value for size features. Optionally, the computing system can generate an aggregate confidence value for the unknown product that includes a combination of each of the abovementioned confidence values. As another example, the computing system can generate a logical combination of the evaluation results. For example, if each of the metrics' evaluation results are true (e.g., each metric value satisfies a threshold evaluation criteria), then the computing system can generate a logical combination of True, thereby indicating that the unknown product likely matches the scanned barcode. Similarly, if any one of the metrics' evaluation results are false (e.g., one of the metrics value(s) does not satisfy the threshold evaluation criteria), the computing system can generate a logical combination of False, thereby indicating that the unknown product likely does not match the scanned barcode. The computing system can combine the evaluation results in one or more other ways in block 1162.

The computing system can determine whether the combined evaluation results pass threshold criteria (block 1164). The combined evaluation results can pass the threshold criteria if any combination of the evaluation results satisfy threshold values. For example, if all the metrics satisfy respective threshold values or an aggregate threshold value, then the computing system can determine that the threshold criteria is passed and the unknown product matches the scanned barcode. As another example, if at least one of the metrics satisfy a respective threshold value or an aggregate threshold value, then the computing system can determine that the threshold criteria is passed and the unknown product matches the scanned barcode. As another example, if none of the metrics satisfy the respective threshold values or an aggregate threshold value, then the computing system can determine that the threshold criteria has not been passed and the unknown product likely does not match the scanned barcode. As yet another example, in some implementations, if at least one of the metrics do not satisfy the respective threshold value, then the computing system can determine that the threshold criteria has not been passed and the unknown product likely does not match the scanned barcode.

Accordingly, if the threshold criteria is passed, the computing system can return an indication of a product match (block 1166). As mentioned above, if all of the evaluation results satisfy respective threshold criteria, the computing system can identify a product match. As another example, if any combination of the evaluation results satisfy the threshold criteria, the computing system can identify a product match. As another example, if the combined evaluation results satisfy the threshold criteria, the computing system can identify a product match.

If the threshold criteria is not passed, the computing system can return an indication of a product mismatch (block 1168). As mentioned above, if none of the evaluation results satisfy respective threshold criteria, the computing system can identify a product mismatch. As another example, if any combination of the evaluation results do not satisfy the threshold criteria, the computing system can identify a product mismatch. As another example, if the combined evaluation results do not satisfy the threshold criteria, the computing system can identify a product mismatch.

While this specification contains many specific implementation details, these should not be construed as limitations on the scope of the disclosed technology or of what may be claimed, but rather as descriptions of features that may be specific to particular embodiments of particular disclosed technologies. Certain features that are described in this specification in the context of separate embodiments can also be implemented in combination in a single embodiment in part or in whole. Conversely, various features that are described in the context of a single embodiment can also be implemented in multiple embodiments separately or in any suitable subcombination. Moreover, although features may be described herein as acting in certain combinations and/or initially claimed as such, one or more features from a claimed combination can in some cases be excised from the combination, and the claimed combination may be directed to a subcombination or variation of a subcombination. Similarly, while operations may be described in a particular order, this should not be understood as requiring that such operations be performed in the particular order or in sequential order, or that all operations be performed, to achieve desirable results. Particular embodiments of the subject matter have been described. Other embodiments are within the scope of the following claims.

What is claimed is:

1. A checkout lane apparatus configured to determine whether an unknown product matches a scanned barcode during a checkout process, the checkout lane apparatus comprising:
   a flatbed scanning area that receives one or more products to be purchased by a user, the flatbed scanning area including one or more scanning devices and cameras;
   a vertical post positioned proximate the flatbed scanning area, the vertical post including a camera positioned above the flatbed scanning area and having a field of view that includes the flatbed scanning area, wherein the camera is configured to capture image data of an unknown product as it is moved over the flatbed scanning area;
   a point of sale (POS) terminal configured to:
      scan, using one or more of the scanning devices and cameras, a product identifier of the unknown product;
      identify, based on the scanned product identifier, a product associated with the scanned product identifier; and
      transmit, to an edge computing device, information about the product associated with the scanned product identifier; and
   an edge computing device configured to determine whether the unknown product matches the product associated with the scanned product identifier, the edge computing device configured to:
      receive, from the camera of the vertical post, the image data of the unknown product;
      retrieve, from a data store, one or more product identification models, the product identification models having been trained and generated by a computing system to generate confidence values indicating how likely an imaged product is one of a subset of different products;
      identify physical feature values for the unknown product based on applying the one or more product identification models to the image data, wherein the physical feature values comprise a plurality of confidence values indicating how likely the unknown product is one of a plurality of candidate products;
      determine, based on the physical feature values for the unknown product, whether the unknown product matches the product associated with the scanned product identifier;
      assign, based on determining that the unknown product does not match the product associated with the scanned product identifier, a ticket-swapping-severity value above a threshold severity value, wherein the ticket-swapping-severity value indicates a severity level of a ticket swapping event performed by the user; and
      select a response amongst a plurality of responses to the ticket swapping event based on the ticket-swapping-severity value, wherein the selected response, when transmitted to and executed by the POS terminal, causes the POS terminal to automatically update a bill of the user from (i) a price corresponding to the scanned product identifier to (ii) a price corresponding to the unknown product, wherein the plurality of responses include at least a response that causes a notification to be sent to a computing device of security personnel indicating the ticket swapping event, the corresponding ticket-swapping-severity value, and the user,
   wherein the one or more product identification models are iteratively trained based on at least one of the image data of the unknown product, the ticket-swapping-severity value assigned to the ticket swapping event performed by the user, and the selected response.

2. The checkout lane apparatus of claim 1, wherein:
   the one or more machine learning product identification models include an n-dimensional feature model, a shape model, and a size model,
   the n-dimensional feature model having been trained to (i) identify features of the unknown product in the image data, (ii) map the identified features into n-dimensional space, (iii) identify clusters in the n-dimensional space, and (iv) generate output indicating n-dimensional space values for the unknown product based on the clusters,
   the shape model having been trained to (i) receive, as input, the image data of the unknown product, (ii) identify shape values of the unknown product in the image data, and (iii) generate output indicating at least one of the identified shape values,
   the size model having been trained to (i) receive, as input, the image data of the unknown product, (ii) identify size values of the unknown product in the image data, the size values including at least one of volume of the unknown product, surface area of the unknown product, quantity of pixels of the unknown product, xy coordinates of the unknown product, and xyz coordinates of the unknown product, and (iii) generate output indicating at least one of the identified size values, and
   the edge computing device is configured to determine that the unknown product matches the product associated with the scanned product identifier based on a determination that at least one of the (i) n-dimensional space values, (ii) at least one of the identified shape values, and (iii) at least one of the identified size values satisfies threshold matching criteria for the product associated with the scanned product identifier.

3. The checkout lane apparatus of claim 2, wherein the edge computing device is further configured to:
   combine (i) the n-dimensional space values, (ii) the at least one of the identified shape values, and (iii) the at least one of the identified size values into an evaluation result;
   determine whether the unknown product matches the product associated with the scanned product identifier based on comparing the evaluation result to an evaluation criteria for the product associated with the scanned product identifier; and
   return an indication of the ticket swapping event based on a determination that the evaluation result does not satisfy the evaluation criteria.

4. The checkout lane apparatus of claim 2, wherein the edge computing device is further configured to:
- evaluate the n-dimensional space values for the unknown product against first evaluation criteria for the product associated with the scanned product identifier;
- evaluate the at least one of the identified shape values for the unknown product against second evaluation criteria for the product associated with the scanned product identifier;
- evaluate the at least one of the identified size values for the unknown product against third evaluation criteria for the product associated with the scanned product identifier; and
- return an indication of the ticket swapping event based on the evaluating steps.

5. The checkout lane apparatus of claim 4, wherein returning the indication of the ticket swapping event is based on (i) the n-dimensional space values not satisfying the first evaluation criteria, (ii) the at least one of the identified shape values not satisfying the second evaluation criteria, and (iii) the at least one of the identified size values not satisfying the third evaluation criteria.

6. The checkout lane apparatus of claim 1, wherein the POS terminal is configured to identify the product associated with the scanned product identifier at a first time and the edge computing device is configured to identify a plurality of candidate product identifications based on applying the one or more product identification models to the image data at a second time.

7. The checkout lane apparatus of claim 6, wherein the first time and the second time are within a threshold amount of time of each other.

8. The checkout lane apparatus of claim 6, wherein the second time is within a threshold amount of time after the first time.

9. The checkout lane apparatus of claim 1, wherein:
- the one or more machine learning product identification models include a product classification model,
- the edge computing device is configured to receive the product classification model from the computing system, wherein the computing system is configured to train the product classification model using a process comprising:
  - receiving image training data for a plurality of known products;
  - training, using the image training data for the plurality of known products, the product classification model to identify features of each of the plurality of known products;
  - mapping the image training data into n-dimensional space, wherein each dimension in the n-dimensional space represents one of the identified features of each of the plurality of known products;
  - identifying clusters in the n-dimensional space, wherein each cluster represents at least one of the plurality of known products having one or more of the identified features;
  - determining, based on the identified clusters for the at least one of the plurality of known products, n-dimensional space feature values for the at least one of the plurality of known products; and
  - outputting the product classification model and the n-dimensional space features values for the at least one of the plurality of known products.

10. The checkout lane apparatus of claim 9, wherein determining the n-dimensional space feature values for the at least one of the plurality of known products includes:
- identifying, for each cluster, a centroid;
- determining, for each cluster, distances between each nearest neighbor and the centroid; and
- determining an aggregate n-dimensional space feature value for the at least one of the plurality of known products based on averaging the distances between each nearest neighbor and the centroid for each of the clusters.

11. The checkout lane apparatus of claim 9, wherein the image training data includes images of the plurality of known products taken from a plurality of cameras at a plurality of checkout lanes, wherein the plurality of cameras have at least one of a same (i) vantage point of the known products, (ii) field of view, and (iii) lighting.

12. The checkout lane apparatus of claim 1, wherein:
- at least one of the one or more machine learning product identification models is a product shape model that was trained to (i) receive, as input, the image data of the unknown product, (ii) identify shape values of the unknown product in the image data, and (iii) generate output indicating at least one of the identified shape values, and
- the edge computing device is configured to determine that the unknown product matches the product associated with the scanned product identifier based on a determination that the at least one of the identified shape values satisfies threshold shape criteria for the product associated with the scanned product identifier.

13. The checkout lane apparatus of claim 1, wherein:
- at least one of the one or more machine learning product identification models is a product size model that was trained to (i) receive, as input, the image data of the unknown product, (ii) identify size values of the unknown product in the image data, the size values including at least one of volume of the unknown product, surface area of the unknown product, quantity of pixels of the unknown product, xy coordinates of the unknown product, and xyz coordinates of the unknown product, and (iii) generate output indicating at least one of the identified size values, and
- the edge computing device is configured to determine that the unknown product matches the product associated with the scanned product identifier based on a determination that the at least one of the identified size values satisfies threshold size criteria for the product associated with the scanned product identifier.

14. The checkout lane apparatus of claim 1, wherein the selected response comprises transmitting an indication of the ticket swapping event to a computing device of an in-store employee, the indication including instructions to monitor the user associated with the ticket swapping event.

15. The checkout lane apparatus of claim 1, wherein one or more of the flatbed scanning area, the vertical post, the POS terminal, and the edge computing device are part of a checkout lane.

16. The checkout lane apparatus of claim 1, wherein the edge computing device is configured to perform product match determinations for a plurality of checkout lanes in a retail environment.

17. The checkout lane apparatus of claim 1, wherein the selected response comprises transmitting an indication of the ticket swapping event to the POS terminal, the POS terminal further configured to stop a transaction at the POS terminal based on the determination that the unknown product does not match the scanned product identifier.

18. A method for determining whether an unknown product matches a scanned barcode during a checkout process, the method comprising:

receiving, by an edge computing device and from a camera positioned above a checkout lane, image data of an unknown product as the unknown product is moved over a flatbed scanning area at the checkout lane;

retrieving, by the edge computing device and from a data store, one or more product identification models having been trained by a computing system to (i) identify physical feature values for the unknown product from the image data and (ii) generate confidence values indicating how likely the unknown product is one of a subset of different products, wherein the one or more machine learning product identification models include an n-dimensional feature model, a shape model, and a size model;

identifying, by the edge computing device, one or more physical feature values for the unknown product based on applying the one or more product identification models to the image data, wherein the physical feature values comprise a plurality of confidence values indicating how likely the unknown product is one of a plurality of candidate products;

determining, by the edge computing device, whether the unknown product matches a product associated with a product identifier that was scanned at the checkout lane based on a determination that at least one of the one or more physical feature values for the unknown product satisfies threshold matching criteria for the product associated with the scanned product identifier;

assigning, by the edge computing device and based on determining that the unknown product does not match the product associated with the product identifier, a ticket-swapping-severity value above a threshold severity value, wherein the ticket-swapping-severity value indicates a severity level of a ticket swapping event performed by a user; and selecting, by the edge computing device, a response amongst a plurality of responses to the ticket swapping event based on the ticket-swapping-severity value, wherein the selected response, when transmitted to and executed by the POS terminal, causes the POS terminal to automatically update a bill of the user from (i) a price corresponding to the scanned product identifier to (ii) a price corresponding to the unknown product, wherein the plurality of responses include at least a response that causes a notification to be sent to a computing device of security personnel indicating the ticket swapping event, the corresponding ticket-swapping-severity value, and the user, wherein the one or more product identification models are iteratively trained based on at least one of the image data of the unknown product, the ticket-swapping-severity value assigned to the ticket swapping event performed by the user, and the selected response.

19. The method of claim 18, wherein the one or more physical feature values include, for the unknown product, at least one of (i) n-dimensional space values, (ii) shape values, and (iii) size values.

20. The method of claim 19, further comprising determining, by the edge computing device, that the unknown product does not match the product associated with the scanned product identifier based on a determination that none of (i)-(ii) satisfy the threshold matching criteria.

* * * * *